US011847367B2

(12) United States Patent
Asai

(10) Patent No.: US 11,847,367 B2
(45) Date of Patent: Dec. 19, 2023

(54) PRINTING SYSTEM, METHOD OF CONTROLLING PRINTING SYSTEM, AND STORAGE MEDIUM COMPRISING A PROJECTION UNIT THAT PROJECTS AN IMAGE, ACCEPT A REQUEST TO PRINT A PROJECTED IMAGE, DETERMINING WHETHER OR NOT PRINTING BASED ON A CAPTURED IMAGE OF THE IMAGE PROJECTED IS POSSIBLE AND RESTRICT OR PERMIT PRINTING BASED ON THE DETERMINATION

(71) Applicant: CANON KABUSHIKI KAISHA, Tokyo (JP)

(72) Inventor: Hidehiko Asai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 17/481,058

(22) Filed: Sep. 21, 2021

(65) Prior Publication Data

US 2022/0100062 A1 Mar. 31, 2022

(30) Foreign Application Priority Data

Sep. 25, 2020 (JP) ................................ 2020-161327

(51) Int. Cl.
*G06F 3/12* (2006.01)
*H04N 1/00* (2006.01)
(52) U.S. Cl.
CPC .......... *G06F 3/1238* (2013.01); *G06F 3/1204* (2013.01); *H04N 1/00209* (2013.01);
(Continued)

(58) Field of Classification Search
CPC .............. G03B 21/134; G03G 15/5016; G06F 3/1204; G06F 3/1222; G06F 3/1238;
(Continued)

(56) References Cited

U.S. PATENT DOCUMENTS

| 2009/0086173 A1* | 4/2009 | Combs ....................... B41J 3/46 |
| | | 353/122 |
| 2014/0362404 A1* | 12/2014 | Miyasaka ............. G06F 3/1273 |
| | | 358/1.15 |
| 2022/0103698 A1* | 3/2022 | Asai ................... H04N 1/00278 |

FOREIGN PATENT DOCUMENTS

| JP | 06141119 A | * | 5/1994 |
| JP | H06-141119 A | | 5/1994 |

(Continued)

*Primary Examiner* — Chad Dickerson
(74) *Attorney, Agent, or Firm* — Canon U.S.A., Inc. IP Division

(57) ABSTRACT

Embodiments of the present disclosure are directed to a printing system comprising accepting a request to print based on a capture image of an image projected by the projection unit; determining whether or not printing based on the capture image of the image projected by the projection unit is possible; in a case where it is determined that the printing of the image projected by the projection unit is possible, permitting the printer to print based on the capture image of the image projected by the projection unit on the basis of the request accepted; and in a case where it is determined that the printing of the image projected by the projection unit is not possible, restricting the printer from printing based on the capture image of the image projected by the projection unit on the basis of the print request accepted.

8 Claims, 32 Drawing Sheets

(52) U.S. Cl.
CPC ..... *H04N 1/00267* (2013.01); *H04N 1/00347* (2013.01); *H04N 1/00848* (2013.01); *H04N 1/00875* (2013.01); *H04N 2201/0094* (2013.01)

(58) Field of Classification Search
CPC .............. G06F 3/1268; H04N 1/00209; H04N 1/00267; H04N 1/00347; H04N 1/00848; H04N 1/00875; H04N 2201/0094
USPC ................................ 358/1.11–1.18, 400–404
See application file for complete search history.

(56) References Cited

FOREIGN PATENT DOCUMENTS

| | | | |
|---|---|---|---|
| JP | 2001-103473 A | | 4/2001 |
| JP | 2004524552 A | * | 8/2004 |

\* cited by examiner

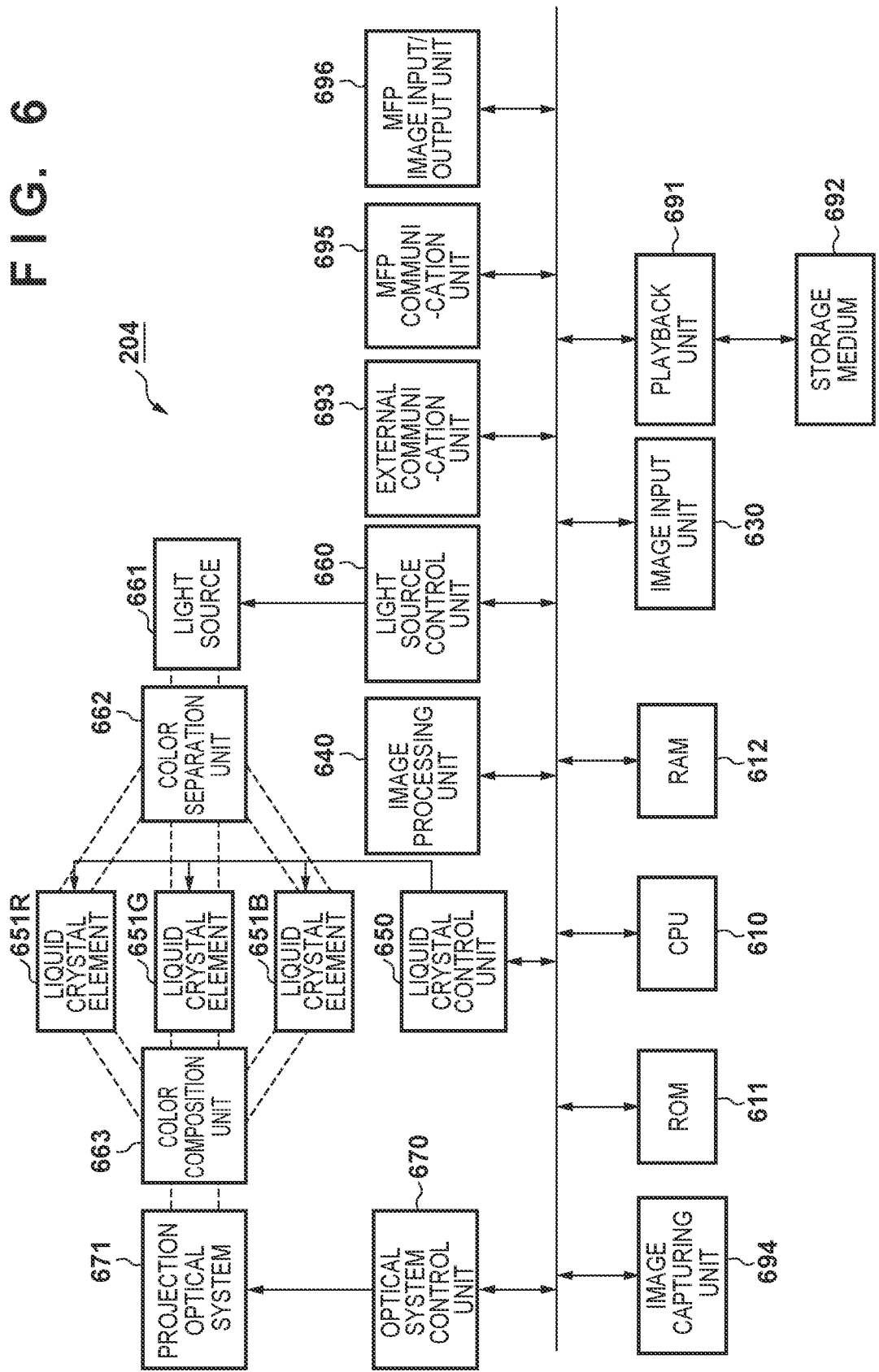

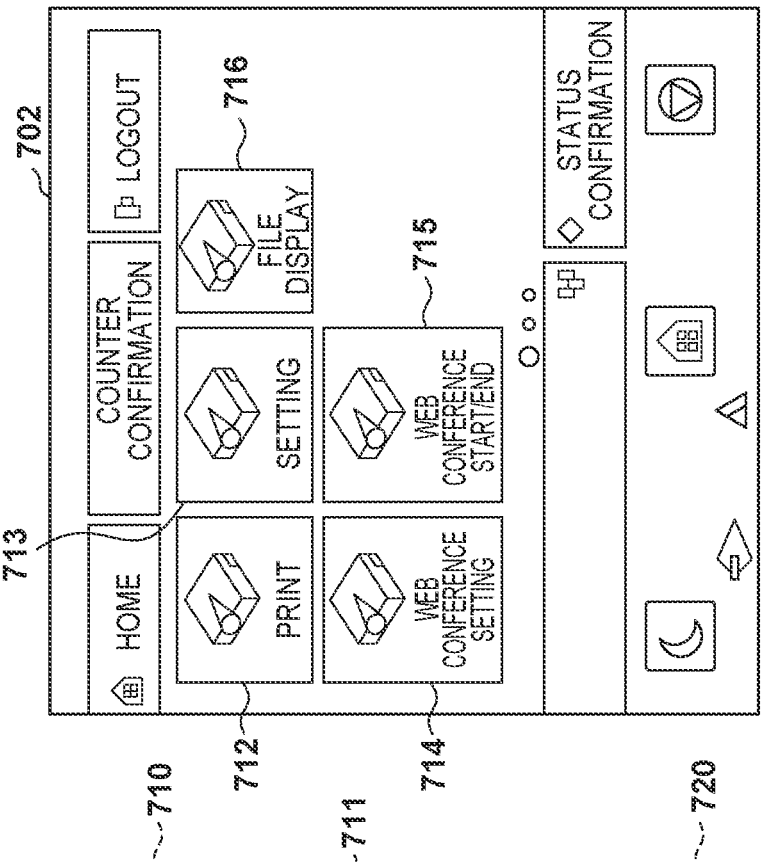
FIG. 7A2
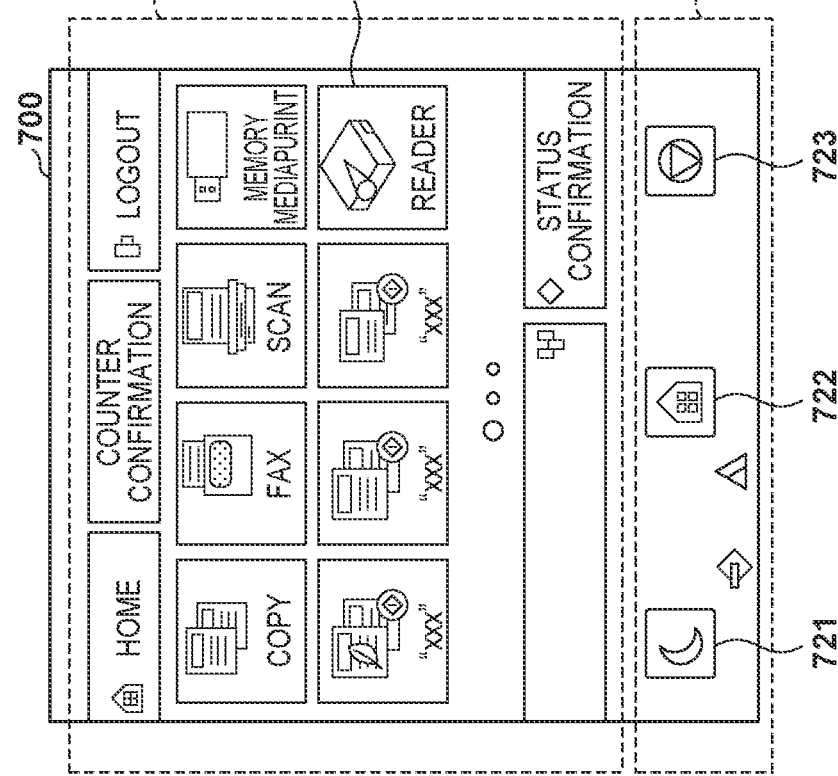
FIG. 7A1

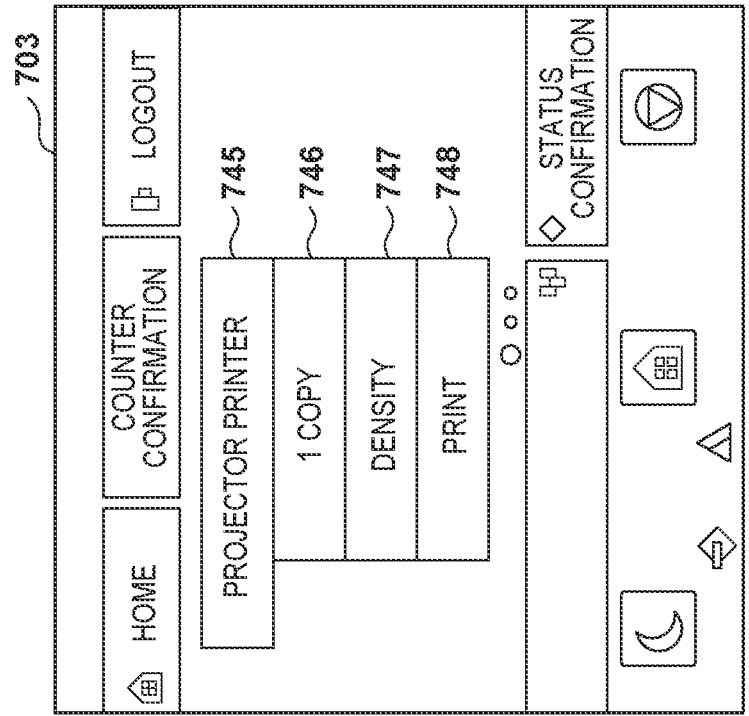
FIG. 7A4
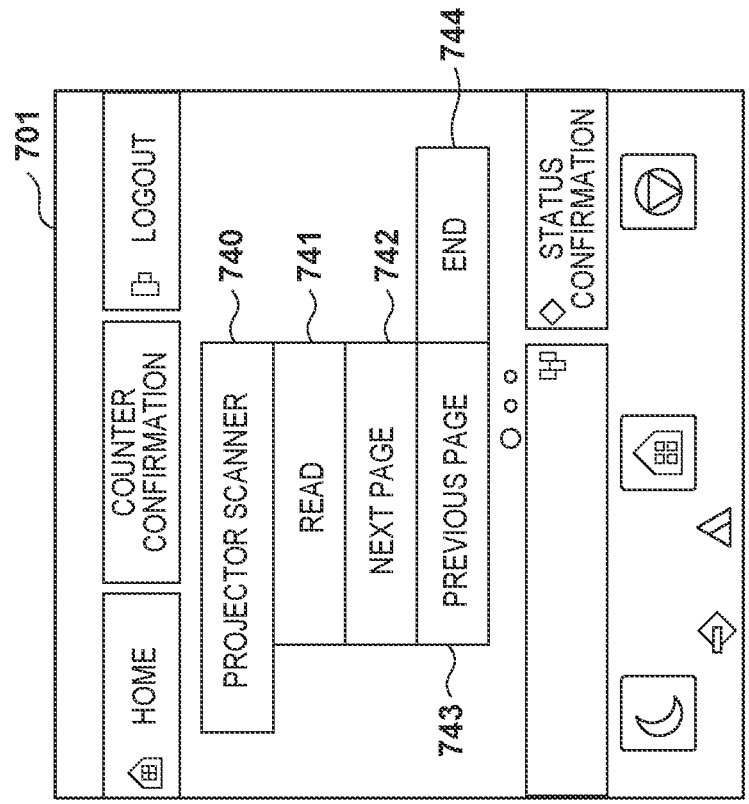
FIG. 7A3

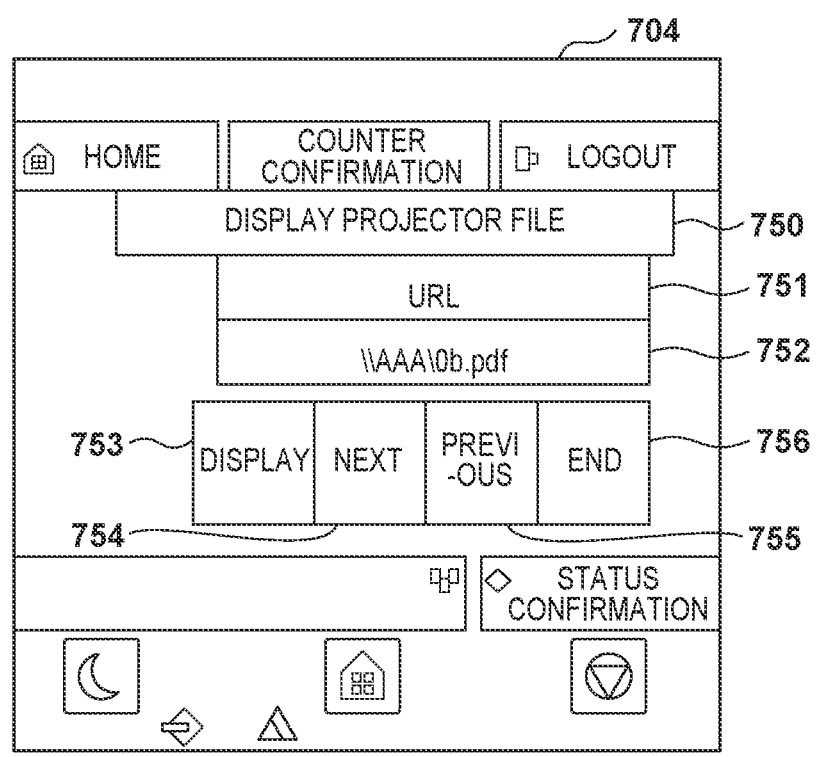
FIG. 7A5

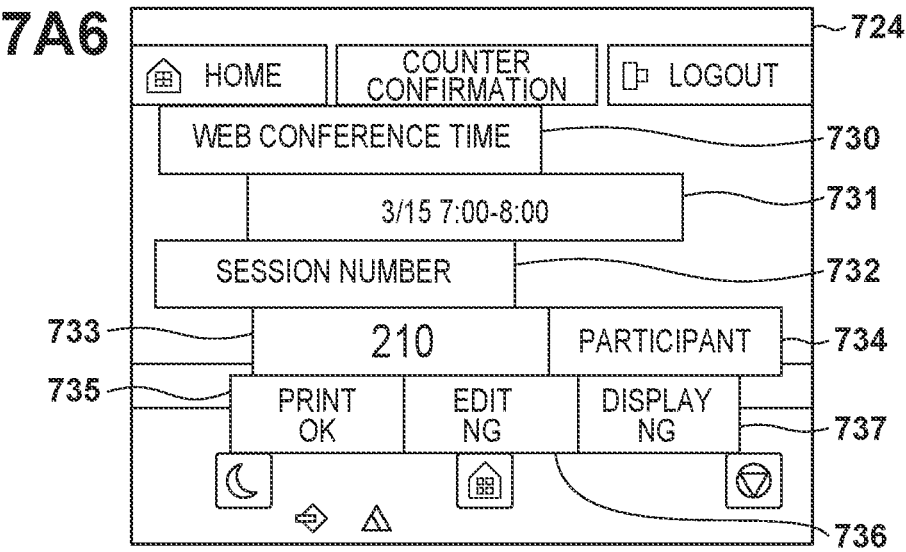
FIG. 7A6
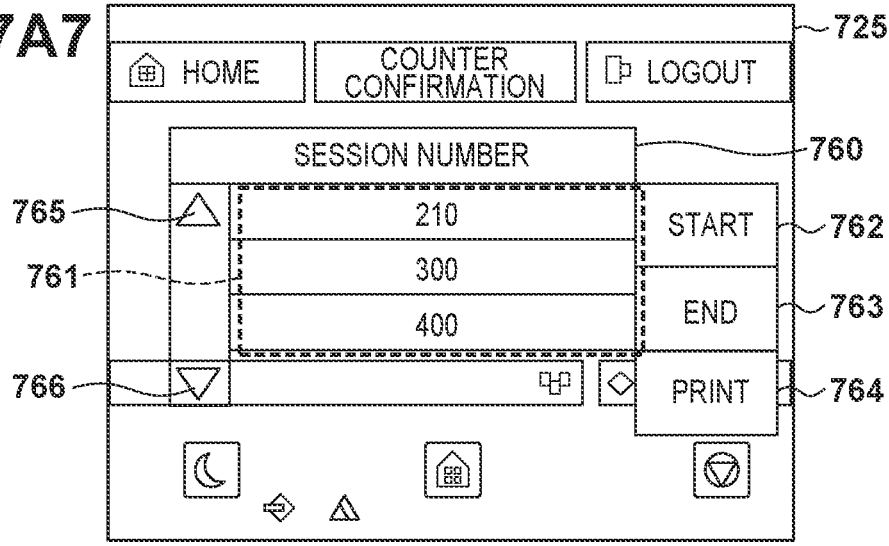
FIG. 7A7
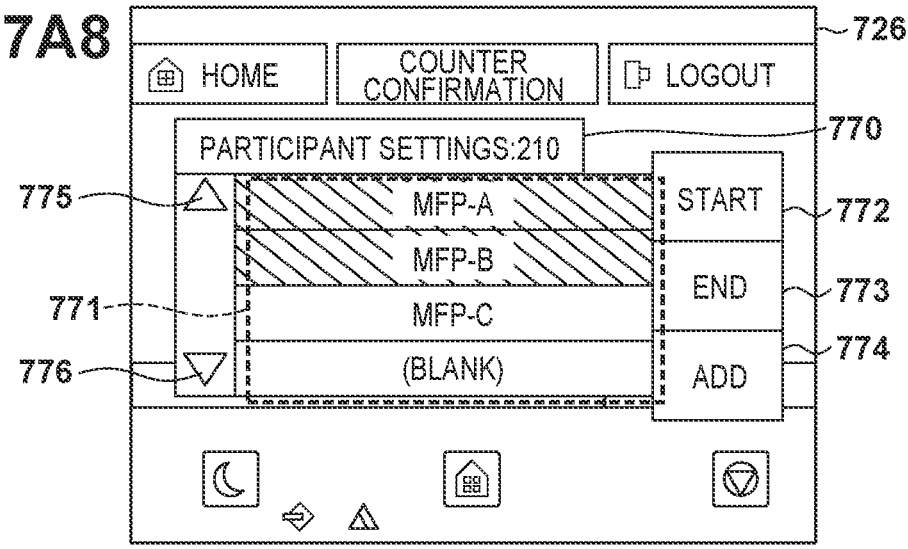
FIG. 7A8

FIG. 7A9
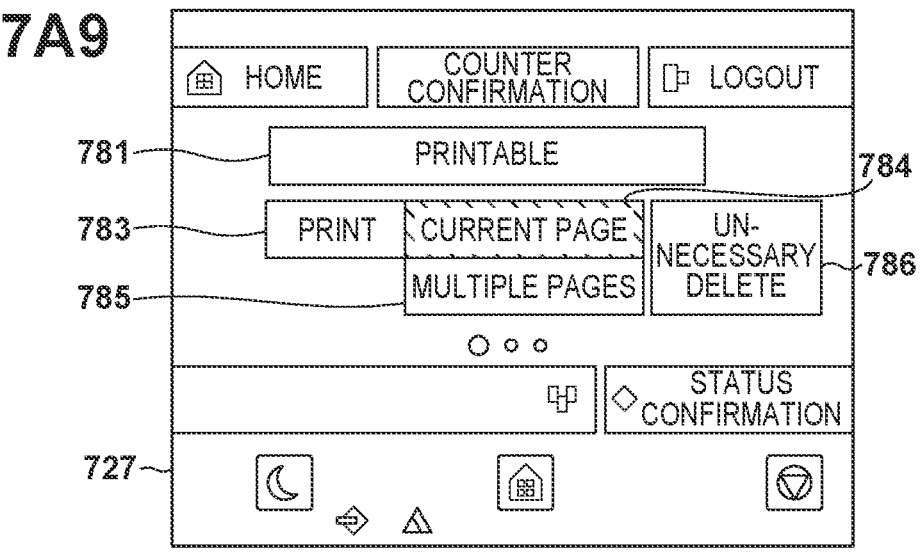
FIG. 7A10
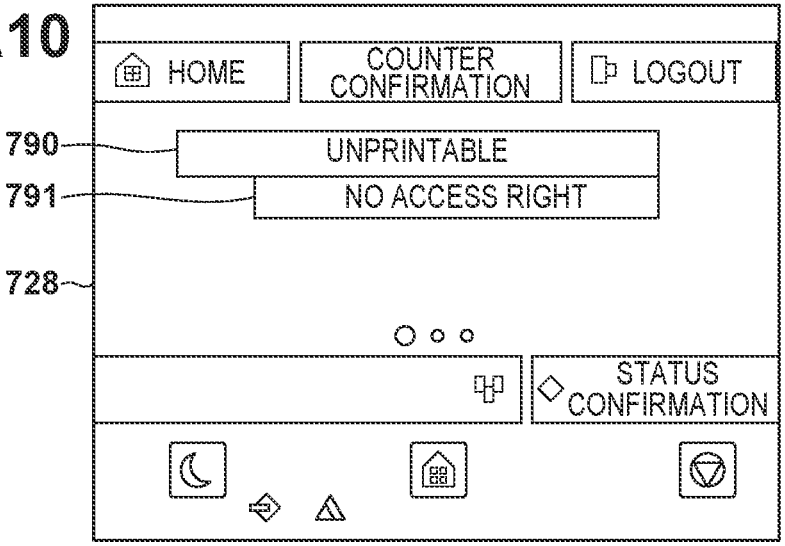
FIG. 7A11
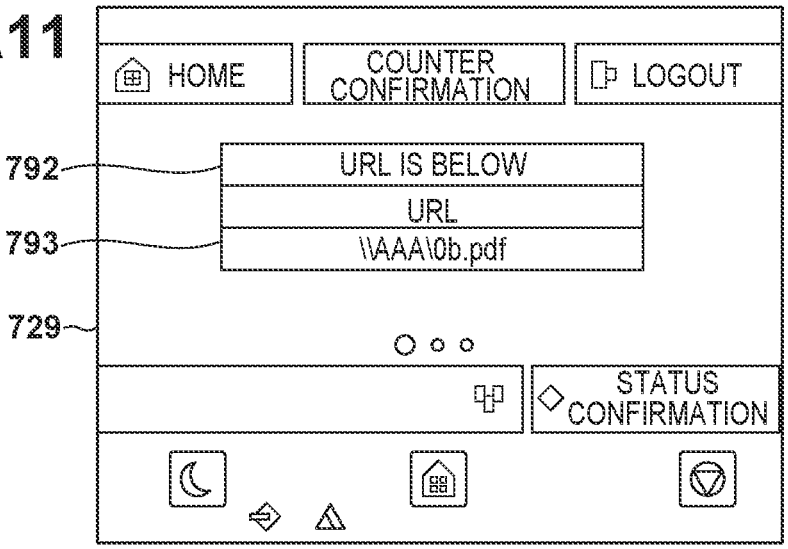

| JOB PRESENCE/ABSENCE | PRESENCE | 801 |
|---|---|---|
| NUMBER OF PAGES | 3 | 802 |
| COLOR FOR EACH PAGE | MONOCHROMATIC | 803 |
| | COLOR | |
| | COLOR | |

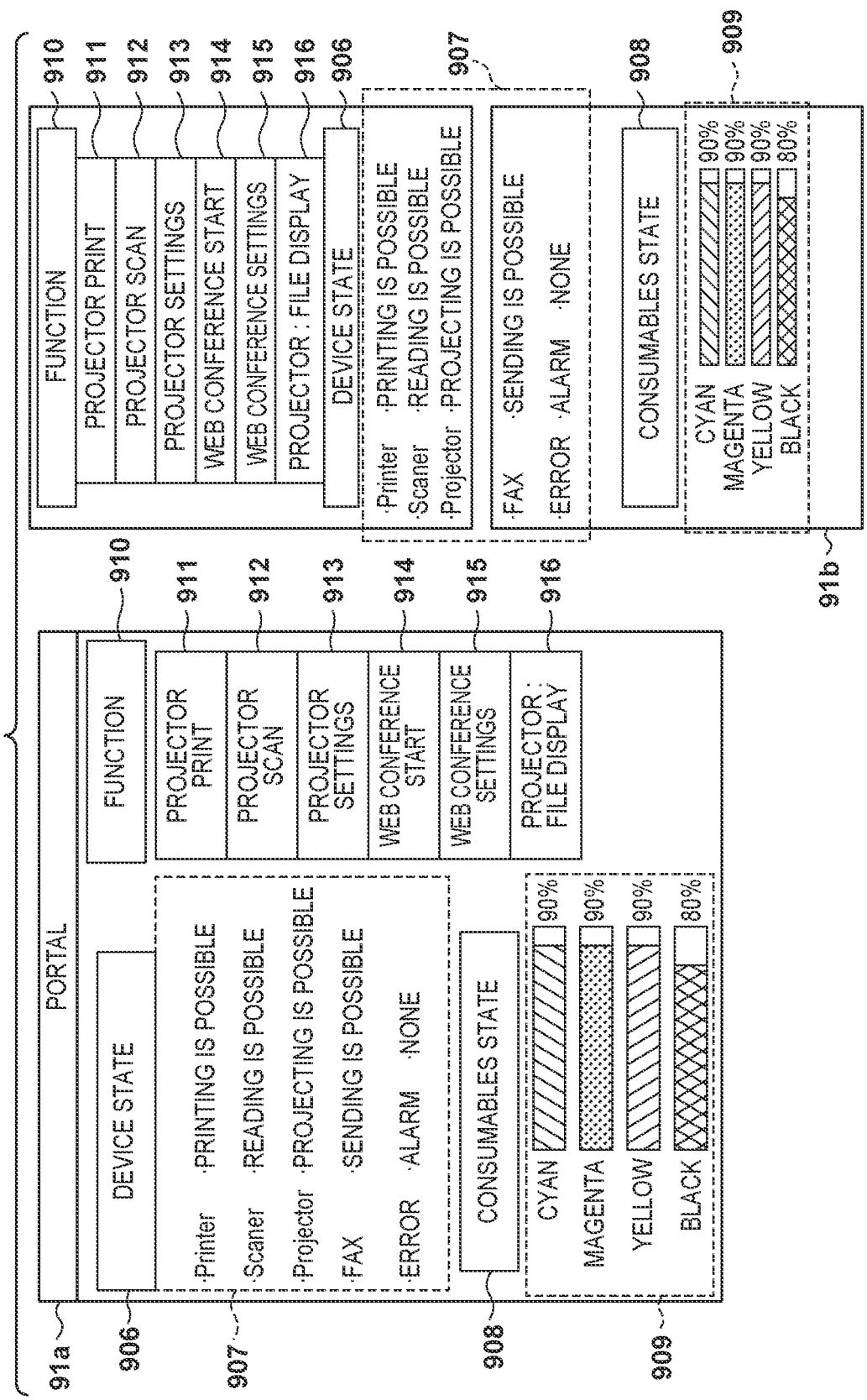

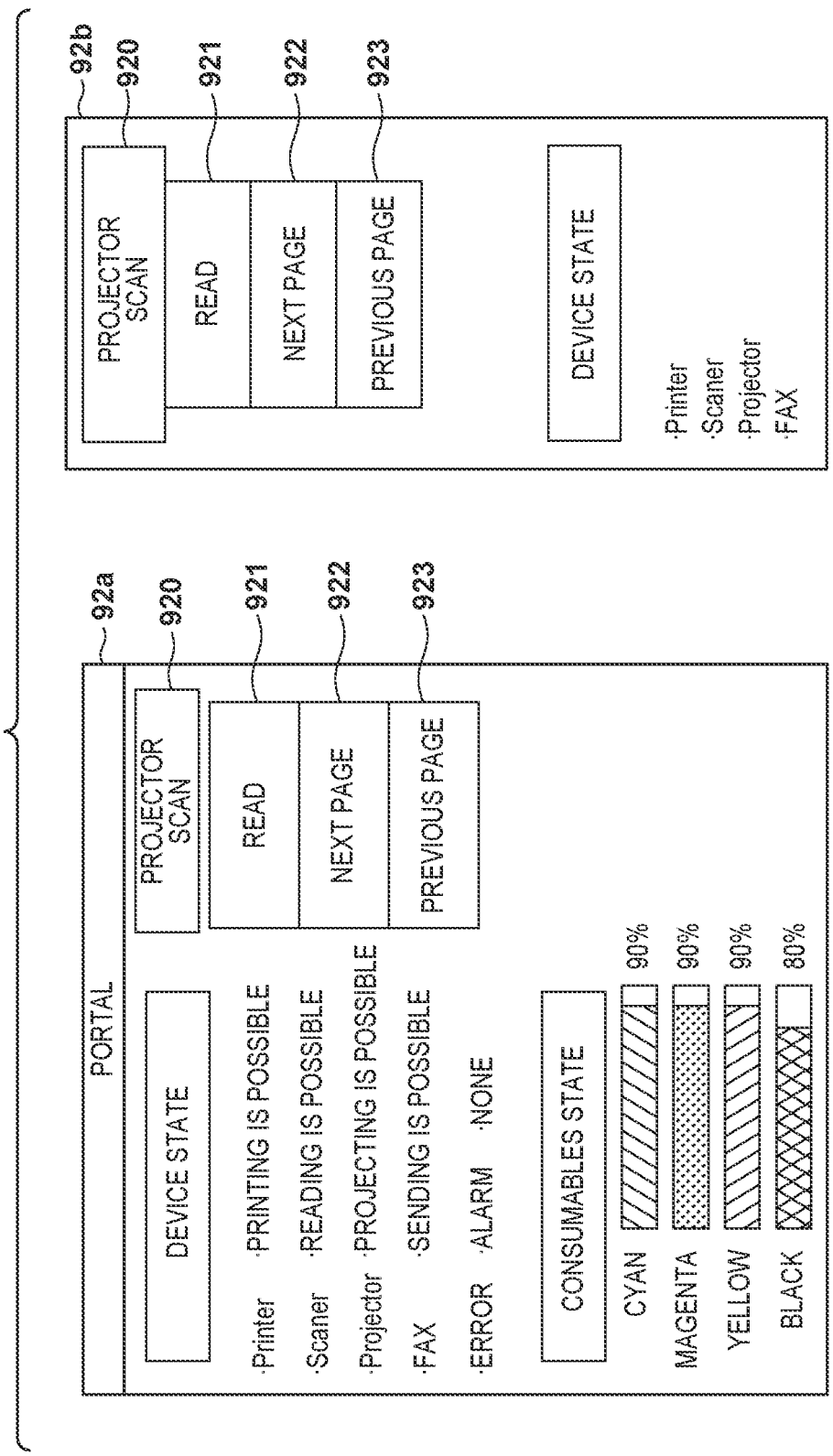

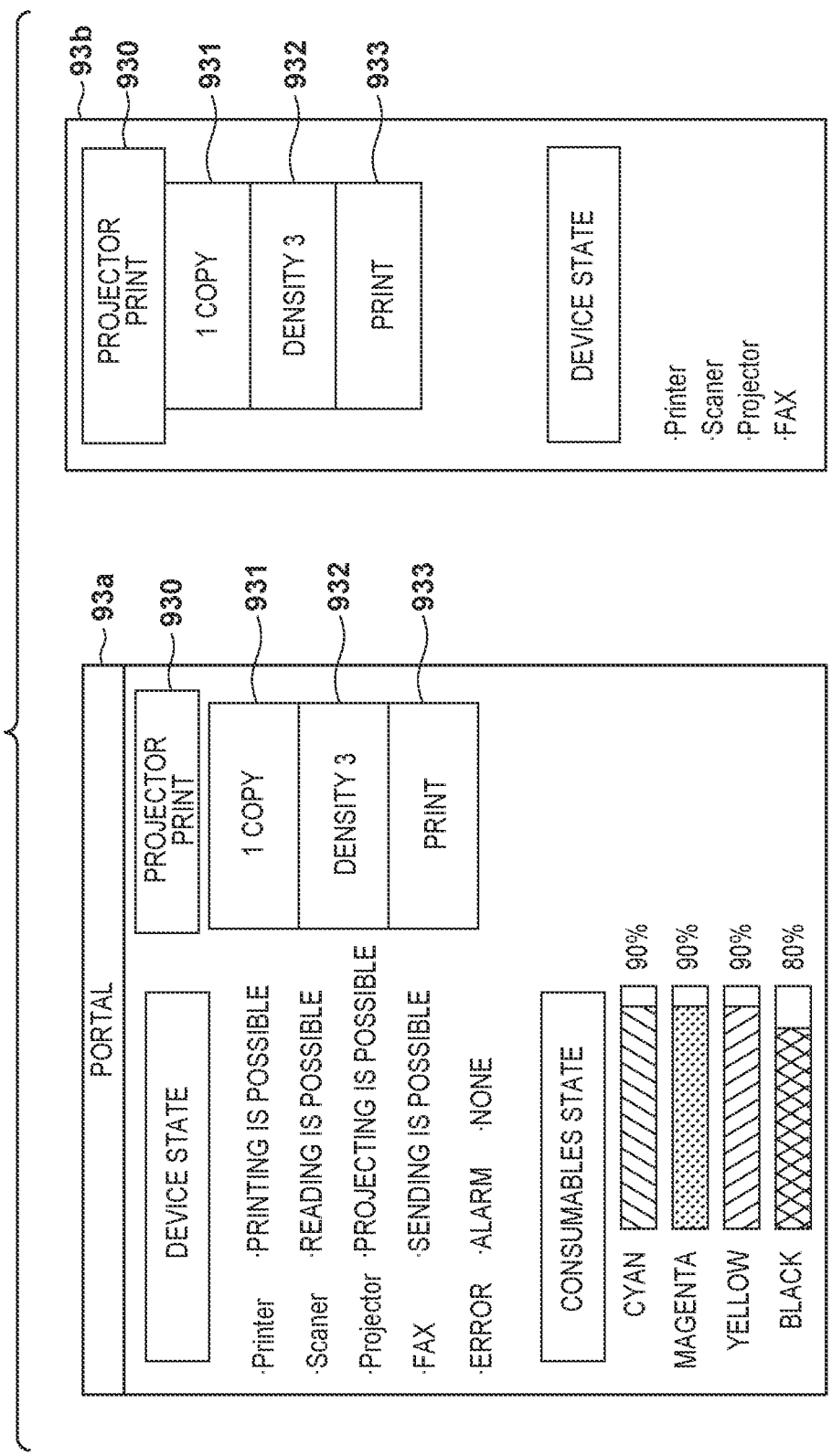

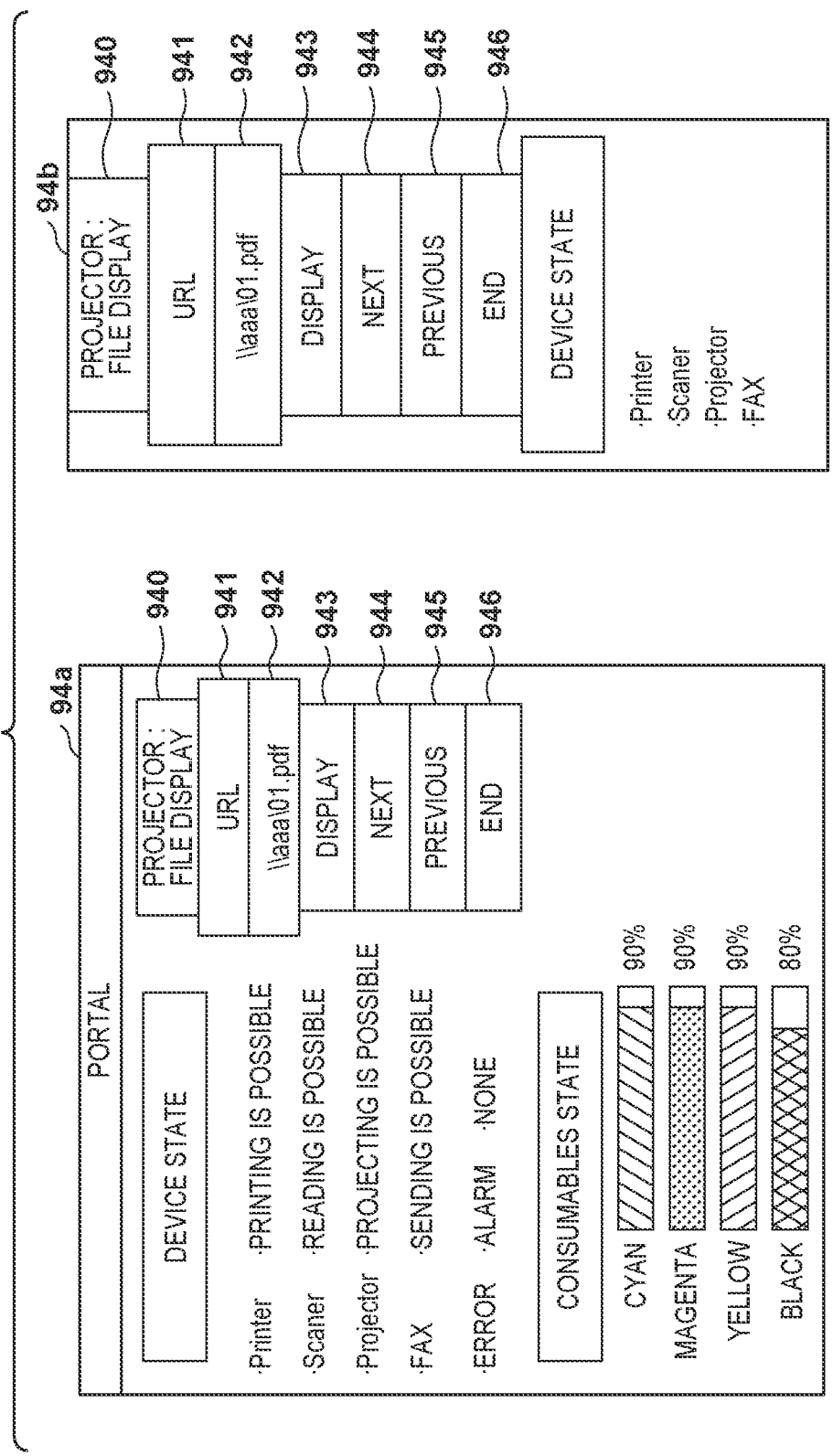

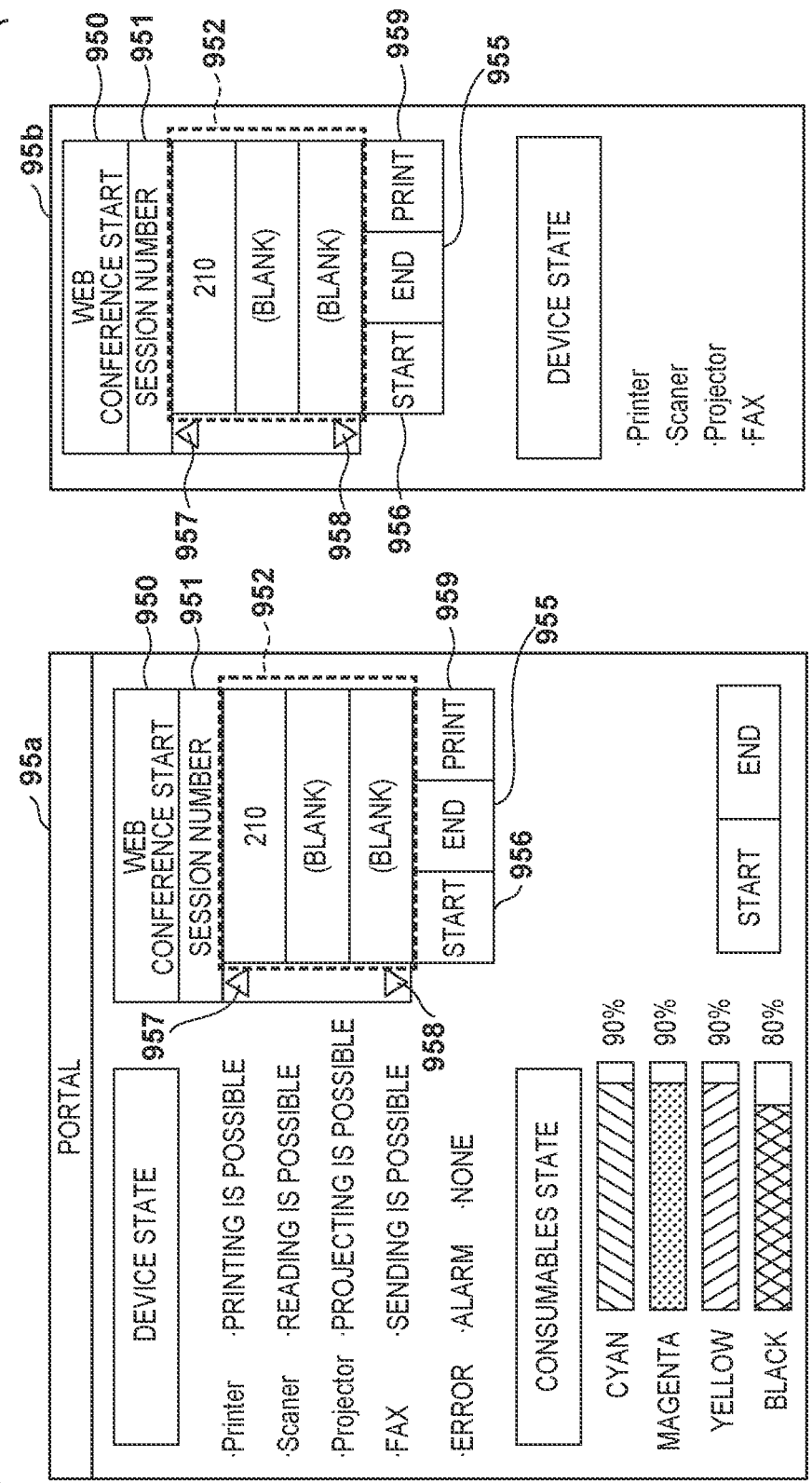

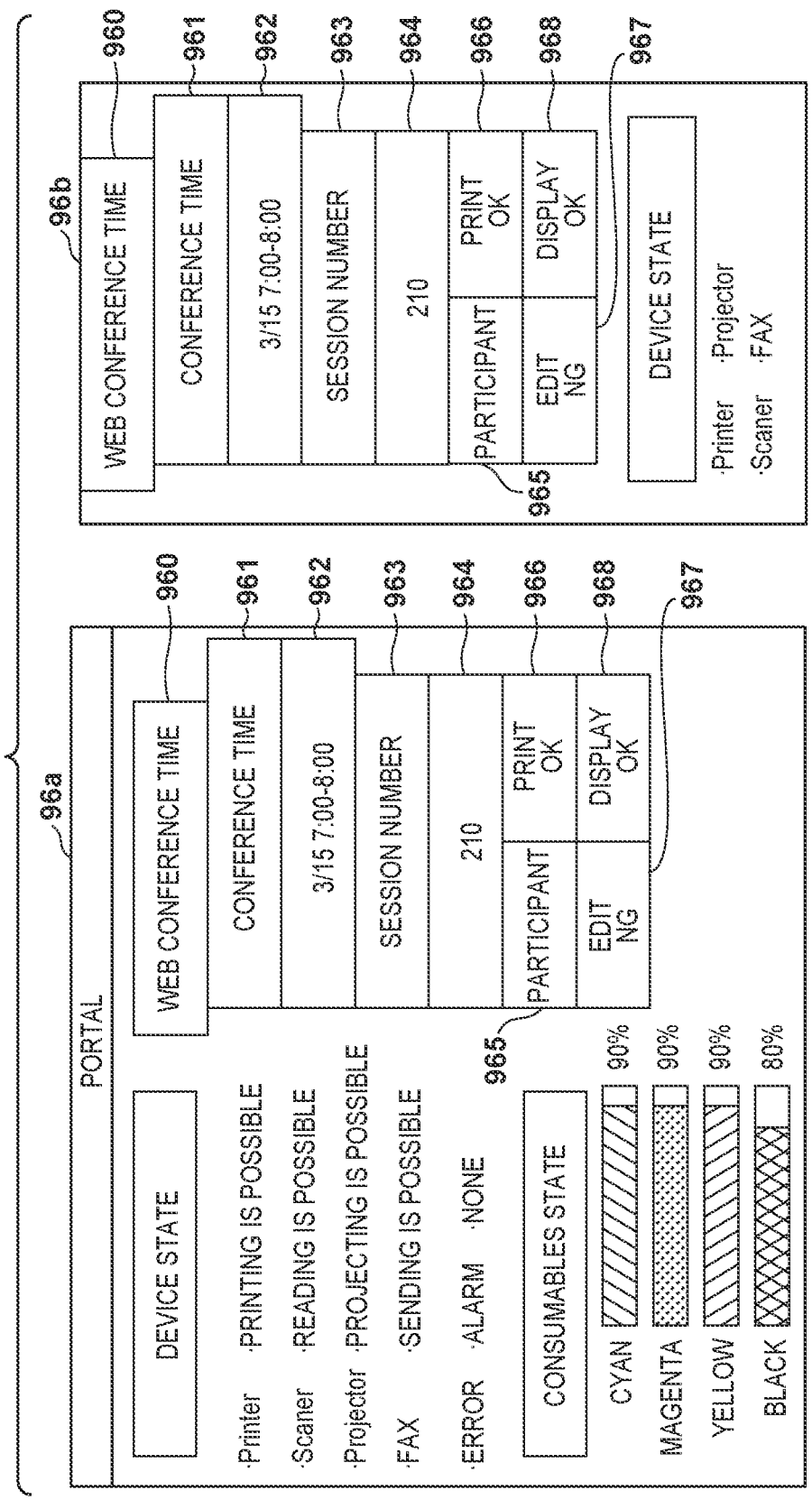

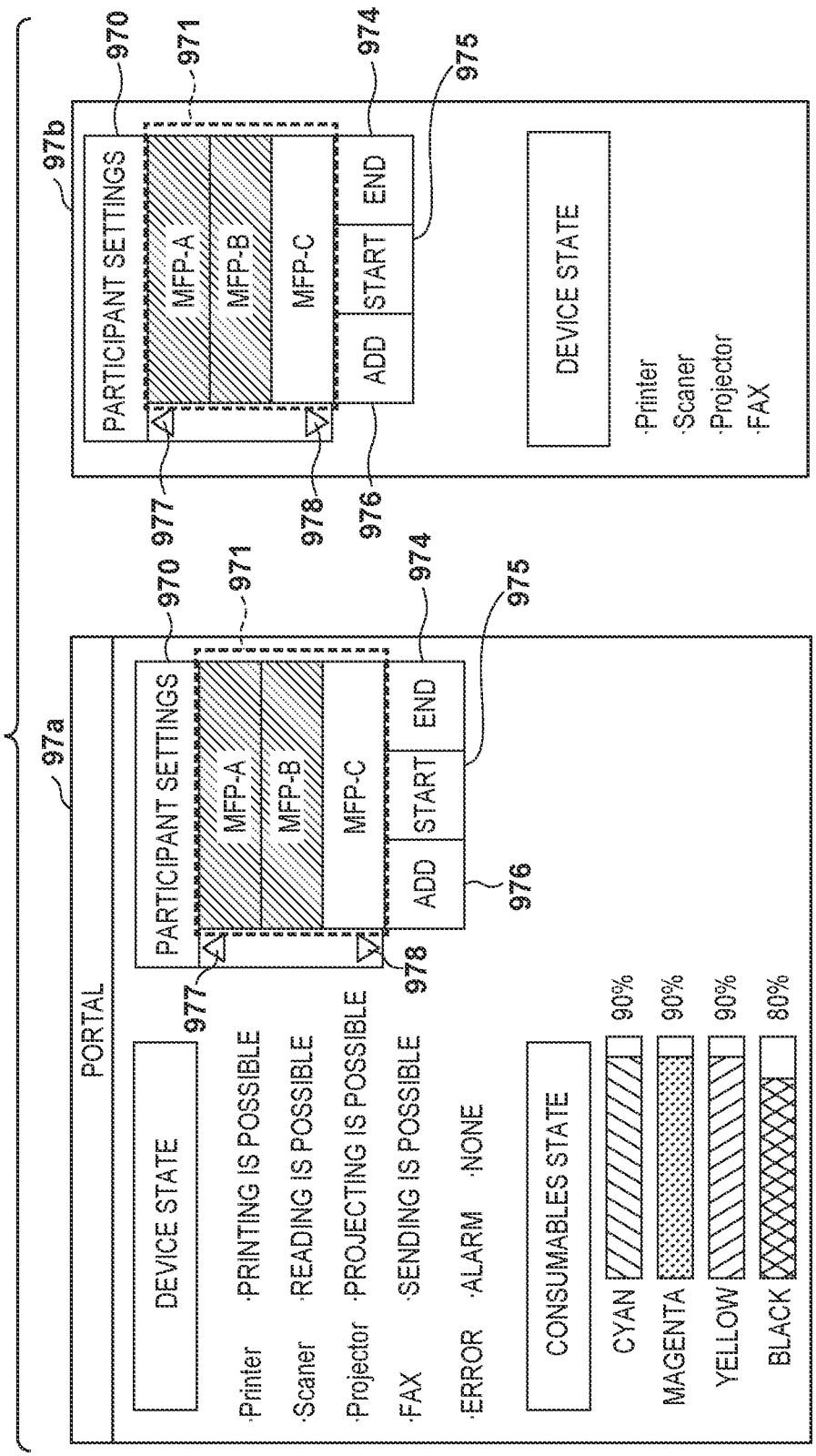

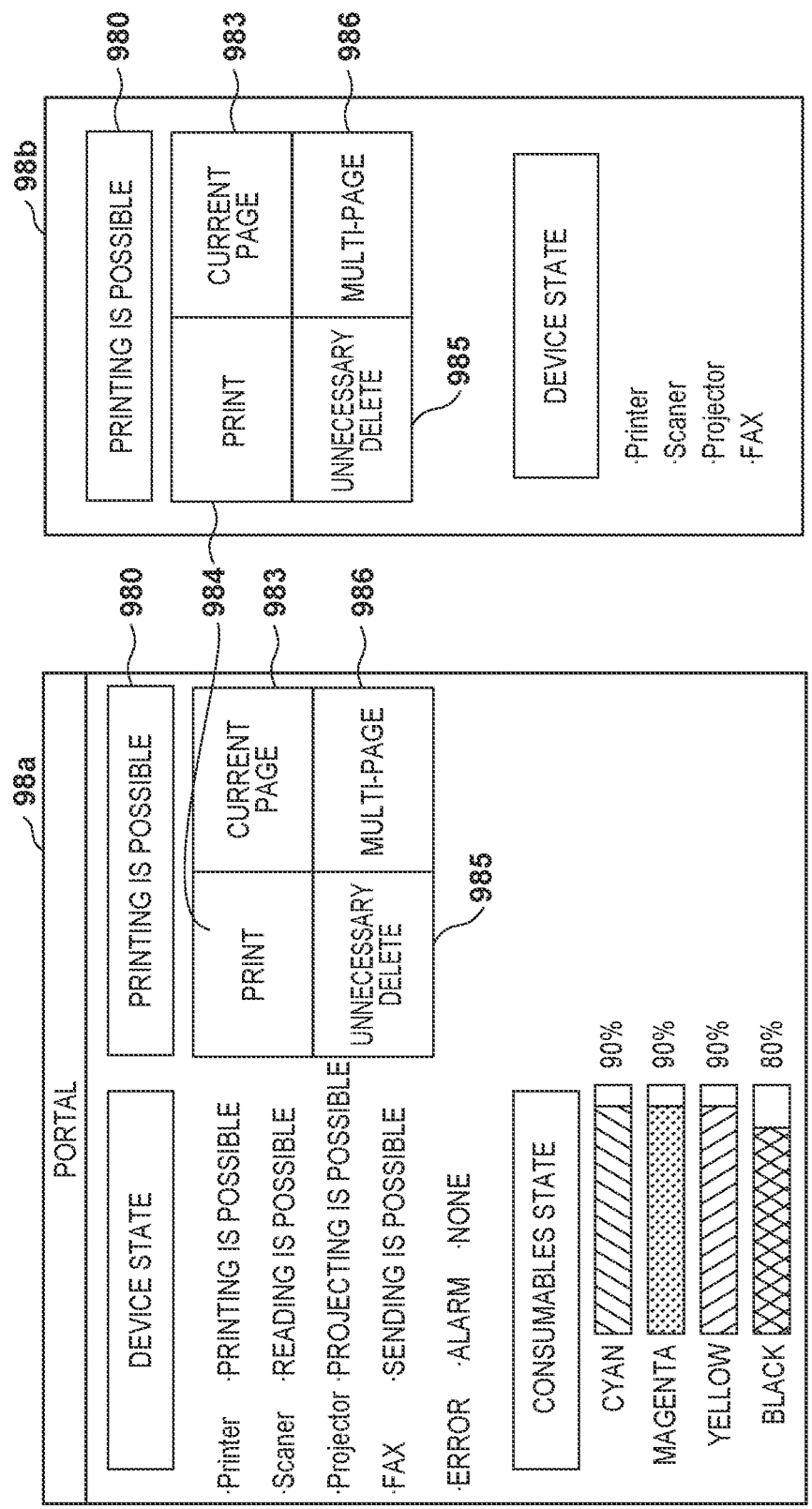

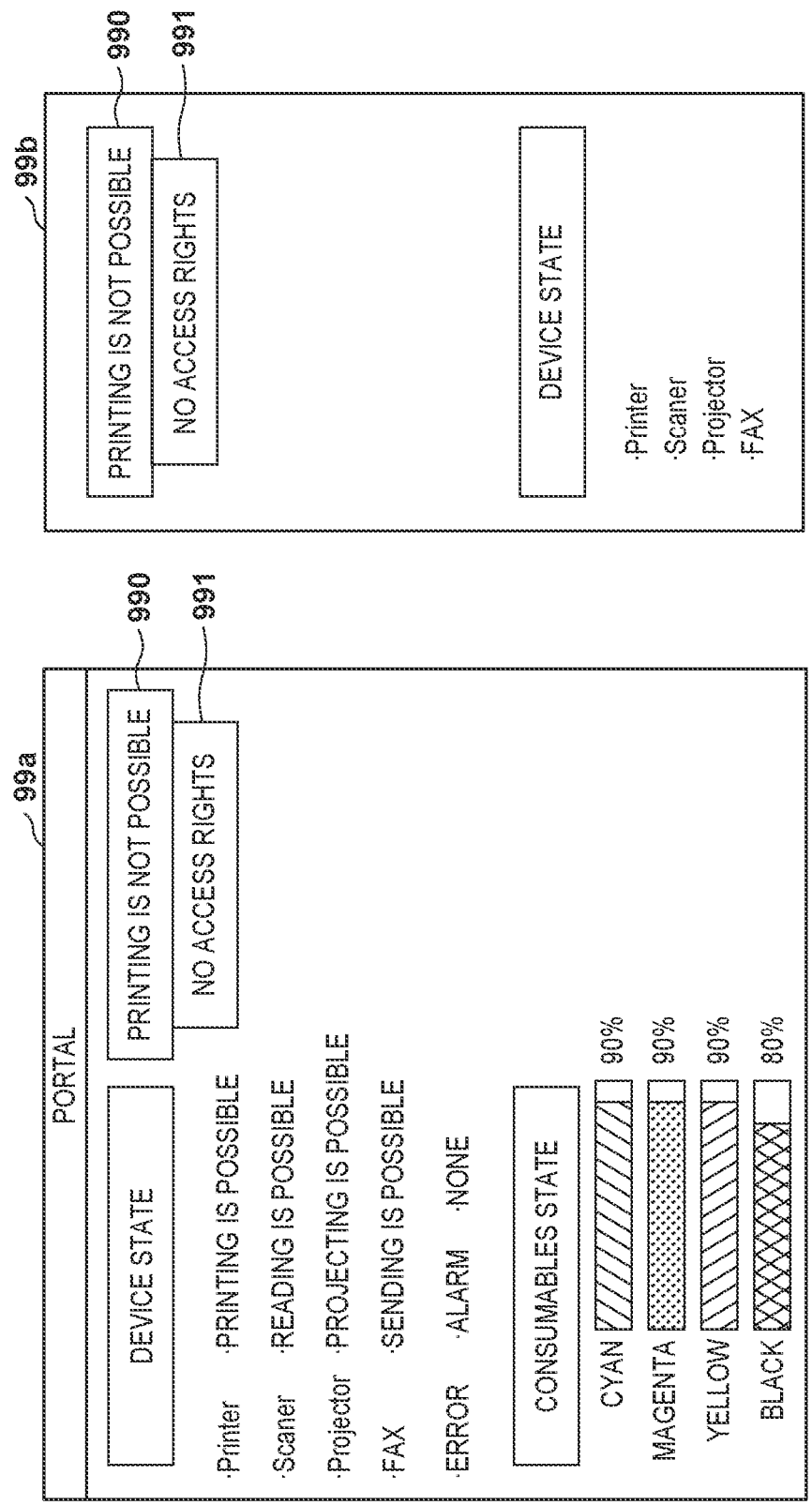

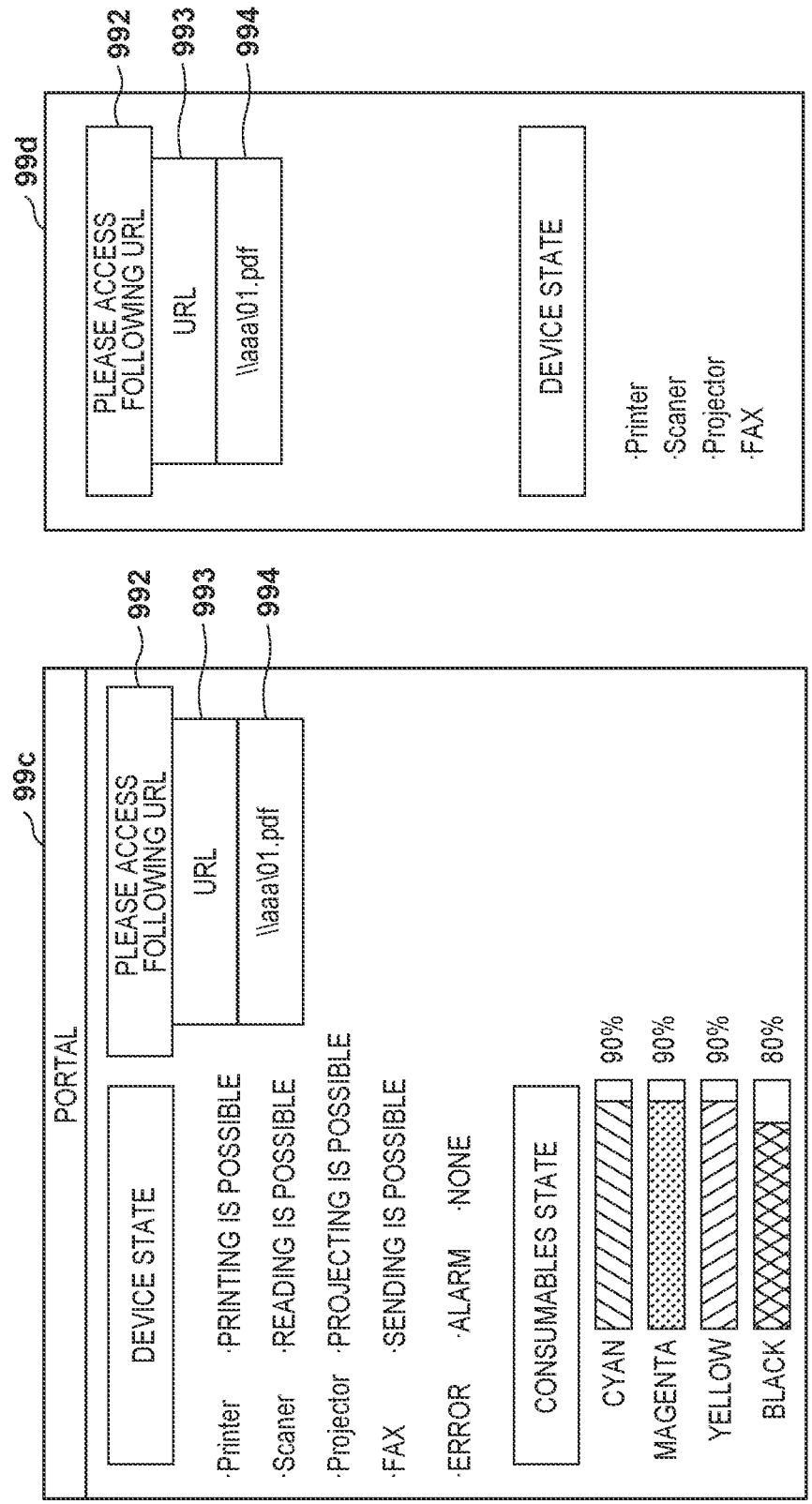

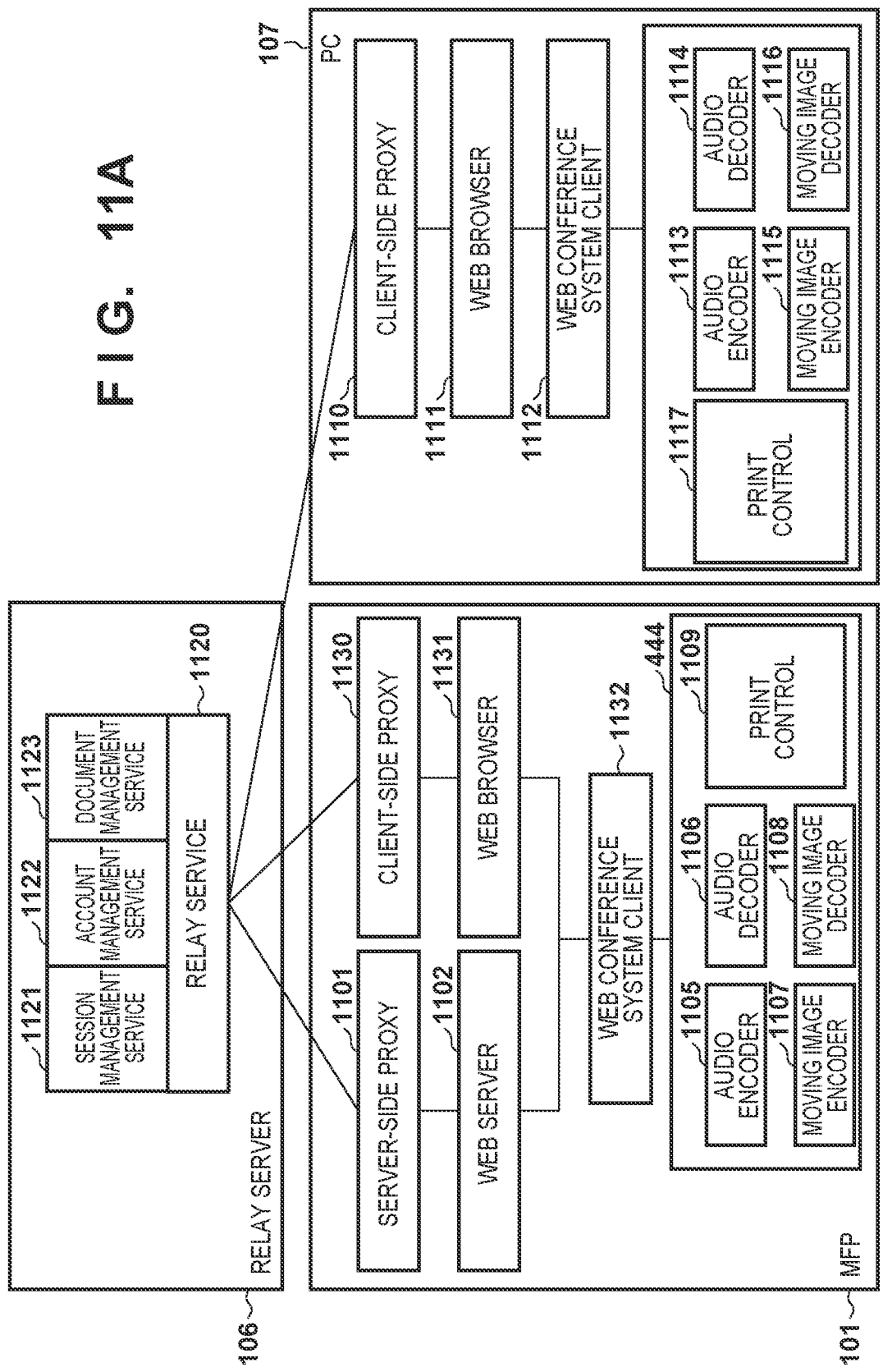

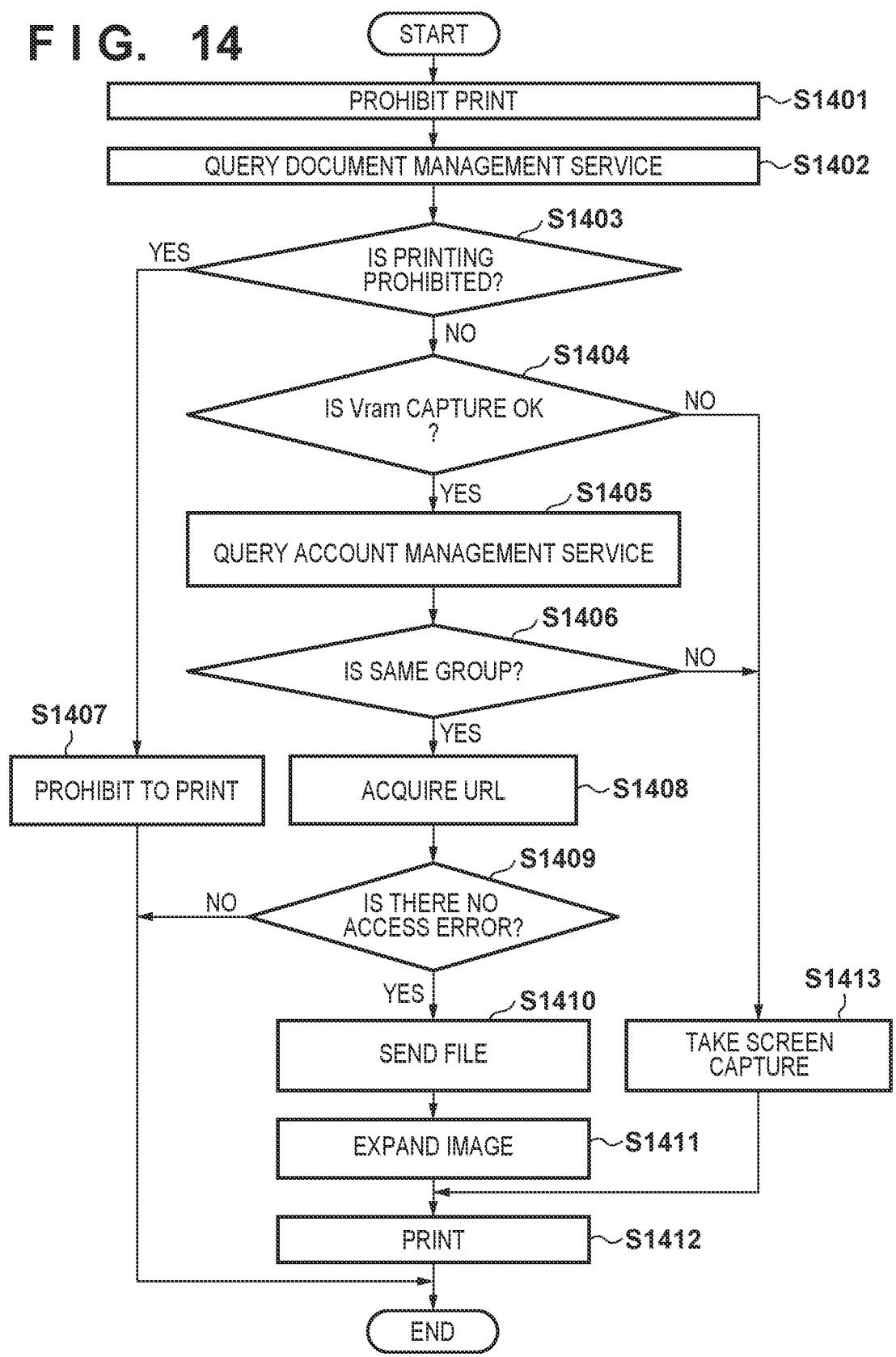

PRINTING SYSTEM, METHOD OF CONTROLLING PRINTING SYSTEM, AND STORAGE MEDIUM COMPRISING A PROJECTION UNIT THAT PROJECTS AN IMAGE, ACCEPT A REQUEST TO PRINT A PROJECTED IMAGE, DETERMINING WHETHER OR NOT PRINTING BASED ON A CAPTURED IMAGE OF THE IMAGE PROJECTED IS POSSIBLE AND RESTRICT OR PERMIT PRINTING BASED ON THE DETERMINATION

BACKGROUND

Field of the Disclosure

The present disclosure relates to a printing system, a method of controlling a printing system, and a storage medium.

Description of the Related Art

Recent years have seen the spread of web conferencing systems for reducing wasted time and money spent on travel to attend conferences. There has been a particular shift from systems requiring dedicated lines to web conferencing systems that use PCs to conduct conferences in a networked environment, and such systems are now in wide use. In a conference using a web conferencing system, there are cases where participants wish to print out images displayed by a projector or display for the purpose of taking notes, as well as cases where participants wish to scan an image of their additions to a document on the spot and post that image to the web conferencing system to share the information. In such a case, it is possible, for example, to acquire a capture image of the screen to be printed out while the screen is being projected by the projector, and then print the image. However, because it allows conference materials and the like to be printed freely, such a method may have issues from the perspective of security, in terms of preventing data from being leaked.

Japanese Patent Laid-Open No. H06-141119 proposes a remote conferencing apparatus that sets, in a document profile of conference materials, information indicating whether or not the materials can be copied and information indicating whether or not to erase the conference materials, and then sends the conference materials.

However, this conventional technique has the following issue. For example, in the above conventional technique, conference documents (called "documents" hereinafter) are simply sent directly in batches, regardless of whether or not they will be displayed by a projector or the like, and network transmission time required for sending and receiving, memory capacity on the receiving side, and the like are not taken into account. A control program is also required to set whether printing is permitted/prohibited in property information of the document which is sent.

On the other hand, in a web conferencing system having moving image and audio sending and receiving functions, a method has been established to send the data necessary for display using moving image compression (MPEG or the like) of a VRAM (Video RAM) area displayed in a display or the like, without directly sending documents. Accordingly, in order to implement printing in a web conferencing system, it is necessary to take a screen capture of the moving image (duplicating the image data in the VRAM for the purpose of printing) and print the screen capture. However, there are cases where one wishes to print a moving image or the like over multiple pages, and in such cases, the usability is poor, as it is necessary to acquire the captured screen each time, and at the same time, there are the same security issues as mentioned above.

SUMMARY

Embodiments of the present disclosure enable realization of a mechanism for printing based on a capture image of a projected image while suppressing a drop in security.

Some embodiments of the present disclosure provide a printing system comprising: a projection unit that projects an image; a printer; an accepting unit that accepts a request to print based on a capture image of an image projected by the projection unit; a determination unit that determines whether or not printing based on the capture image of the image projected by the projection unit is possible; and a control unit that: in a case where the determination unit determines that the printing of the image projected by the projection unit is possible, permits the printer to print based on the capture image of the image projected by the projection unit on the basis of the request accepted by the accepting unit, and in a case where the determination unit determines that the printing of the image projected by the projection unit is not possible, restricts the printer from printing based on the capture image of the image projected by the projection unit on the basis of the print request accepted by the accepting unit.

Some embodiments of the present disclosure provide a method of controlling a printing system, the printing system including a projection unit that projects an image and a printer, and the method comprising: accepting a request to print based on a capture image of an image projected by the projection unit; determining whether or not printing based on the capture image of the image projected by the projection unit is possible; in a case where it is determined that the printing of the image projected by the projection unit is possible, permitting the printer to print based on the capture image of the image projected by the projection unit on the basis of the request accepted; and in a case where it is determined that the printing of the image projected by the projection unit is not possible, restricting the printer from printing based on the capture image of the image projected by the projection unit on the basis of the print request accepted.

Some embodiments of the present disclosure provide a non-transitory computer-readable storage medium storing a computer program for causing a computer to execute each step of a method of controlling a printing system, the printing system including a projection unit that projects an image and a printer, and the method comprising: accepting a request to print based on a capture image of an image projected by the projection unit; determining whether or not printing based on the capture image of the image projected by the projection unit is possible; in a case where it is determined that the printing of the image projected by the projection unit is possible, permitting the printer to print based on the capture image of the image projected by the projection unit on the basis of the request accepted; and in a case where it is determined that the printing of the image projected by the projection unit is not possible, restricting the printer from printing based on the capture image of the image projected by the projection unit on the basis of the print request accepted.

Further features of the present disclosure will be apparent from the following description of exemplary embodiments with reference to the attached drawings.

BRIEF DESCRIPTION OF THE DRAWINGS

FIG. 6 is a diagram illustrating a projector control unit according to an embodiment.

FIGS. 7A1-7A11 are a diagram illustrating a screen displayed in an operation unit 250 according to an embodiment.

FIGS. 9A1-9A4 are a diagram illustrating a remote operation unit according to an embodiment.

FIGS. 9B1-9B4 are a diagram illustrating a remote operation unit according to an embodiment.

FIGS. 9C1 to 9C3 are a diagram illustrating a remote operation unit according to an embodiment.

FIG. 11A is a diagram illustrating an example of the functional configuration of each of apparatuses according to an embodiment.

FIG. 14 is a flowchart illustrating printing in a web conference according to an embodiment.

DESCRIPTION OF THE EMBODIMENTS

Figure 1:
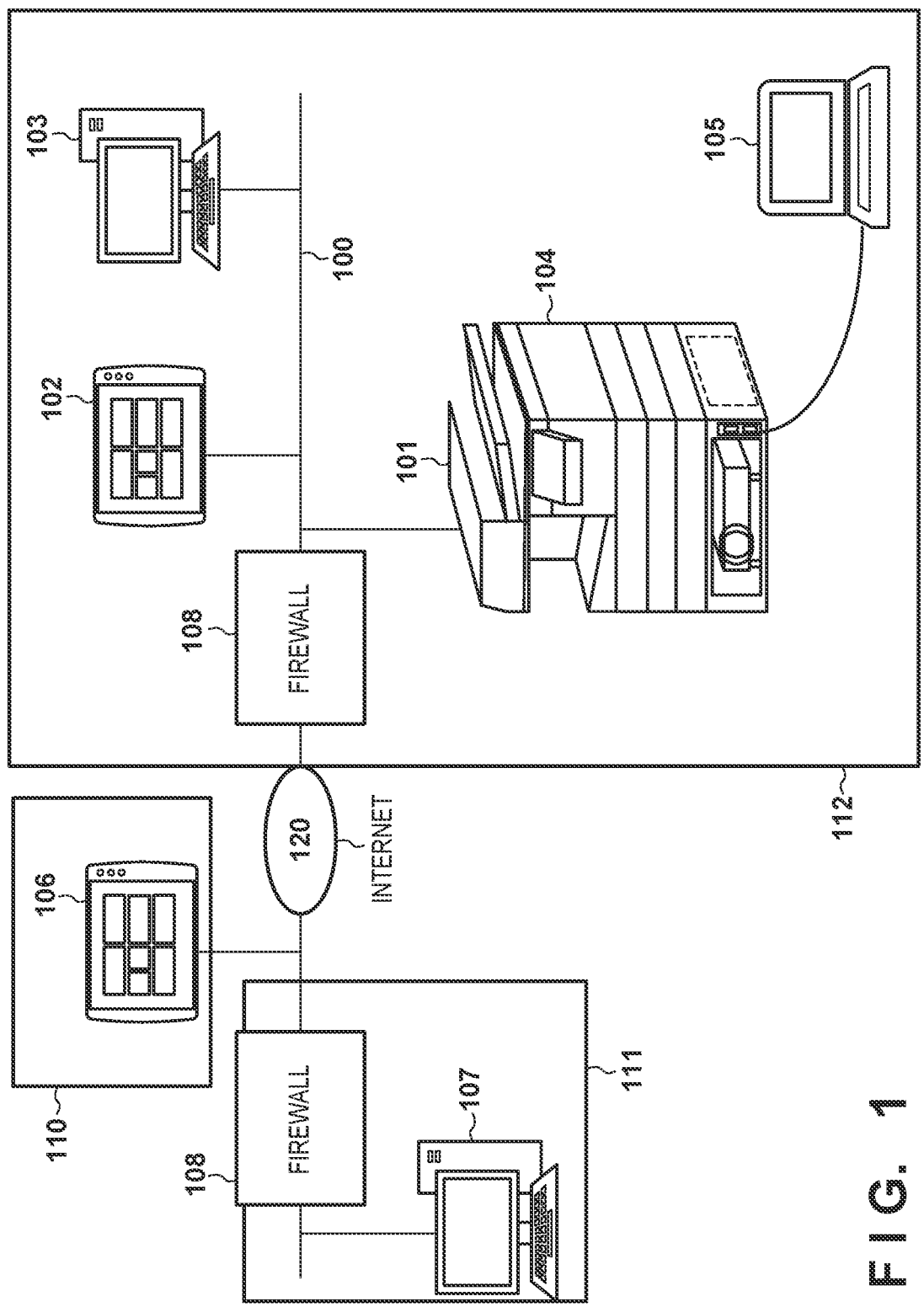
FIG. 1 is a diagram illustrating a system configuration according to an embodiment.

Hereinafter, embodiments will be described in detail with reference to the attached drawings. Note, the following embodiments are not intended to limit the scope of the disclosure. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

First Embodiment

System Hardware Configuration

An embodiment of the present disclosure will be described hereinafter. First, an example of a system configuration according to the present embodiment will be described with reference to FIG. 1. This system is constituted by a server group 110, a user environment 111 of a web conferencing system, and a user environment 112 of an image processing system. These environments are connected to each other via the Internet 120 to be capable of sending and receiving information. The user environment 112 of the image processing system includes a full-color MFP 101, which uses the electrophotographic method, as an example of an image processing apparatus, a file server 102, and a personal computer (PC) 103. The apparatuses are communicatively connected to each other over a network 100, and are connected to the Internet 120 via a firewall 108. The present embodiment will describe a full-color MFP as an example, but an MFP that reads in color but prints in black-and-white, or an MFP that both reads and prints in black-and-white, can be applied as well. In this manner, any MFP can be applied, and will therefore be referred to simply as the MFP 101 hereinafter.

The MFP 101 includes copy, fax, and printer functions. The MFP 101 further has a "send" function for sending an image file scanned by a reader function unit 201 to a computer device, as well as an IFAX function for communicating an image scanned by a scanner between devices of the same type and printing the received image. The PC 103, which is an external apparatus, uses a printer driver to convert a file generated by an application on the PC and sends the file to a printer function unit 202 of the MFP 101, where the image is formed on a storage medium. The file server 102, which stores data, stores other files generated by the PC 103, files generated by another PC (not shown), and so on. The PC 103 can also send a file on the file server 102 to the MFP 101 and cause an image to be formed on a storage medium. The file server 102 and the MFP 101 use the SMB protocol, the WebDAV protocol, or the like for file sharing. SMB is an acronym of "Server Message Block". WebDAV stands for "Web-based Distributed Authoring and Versioning". The MFP 101 uses a facsimile protocol to send read image data read from a document by the reader function unit 201 to a public line 104. The MFP 101 also transfers image data received from the public line 104 to the printer function unit 202 and causes an image to be formed on a storage medium.

The web conferencing system is constituted by a relay server 106 of the server group 110, as well as web conferencing system clients 1132 and 1112 included in the MFP 101, a PC 107, and the like installed in the user environments 111 and 112. A web conference can be conducted by connecting each of these components over the Internet. A plurality each of the PC 107, the relay server 106, and the MFP 101 may be installed. Additionally, although FIG. 1 illustrates the MFP 101 as being located in the user environment 112, another information processing apparatus may be located there as well. Here, the "other information processing apparatus" may be, for example, a PC, a server apparatus, a tablet terminal, or the like. The firewall 108 provided in the user environment 112 is configured to permit terminals inside the user environment 112 to connect to the Internet 120, but prohibit connections to the terminals inside the user environment 112 from the Internet 120 side.

The server group 110 is a server group constituted by server computers which provide services over the Internet 120, and may be one or more server computers. FIG. 1 illustrates the server group 110 as being constituted only by the one relay server 106. The relay server 106 is an example of an information processing apparatus.

Projector Expansion Unit

Figure 2:
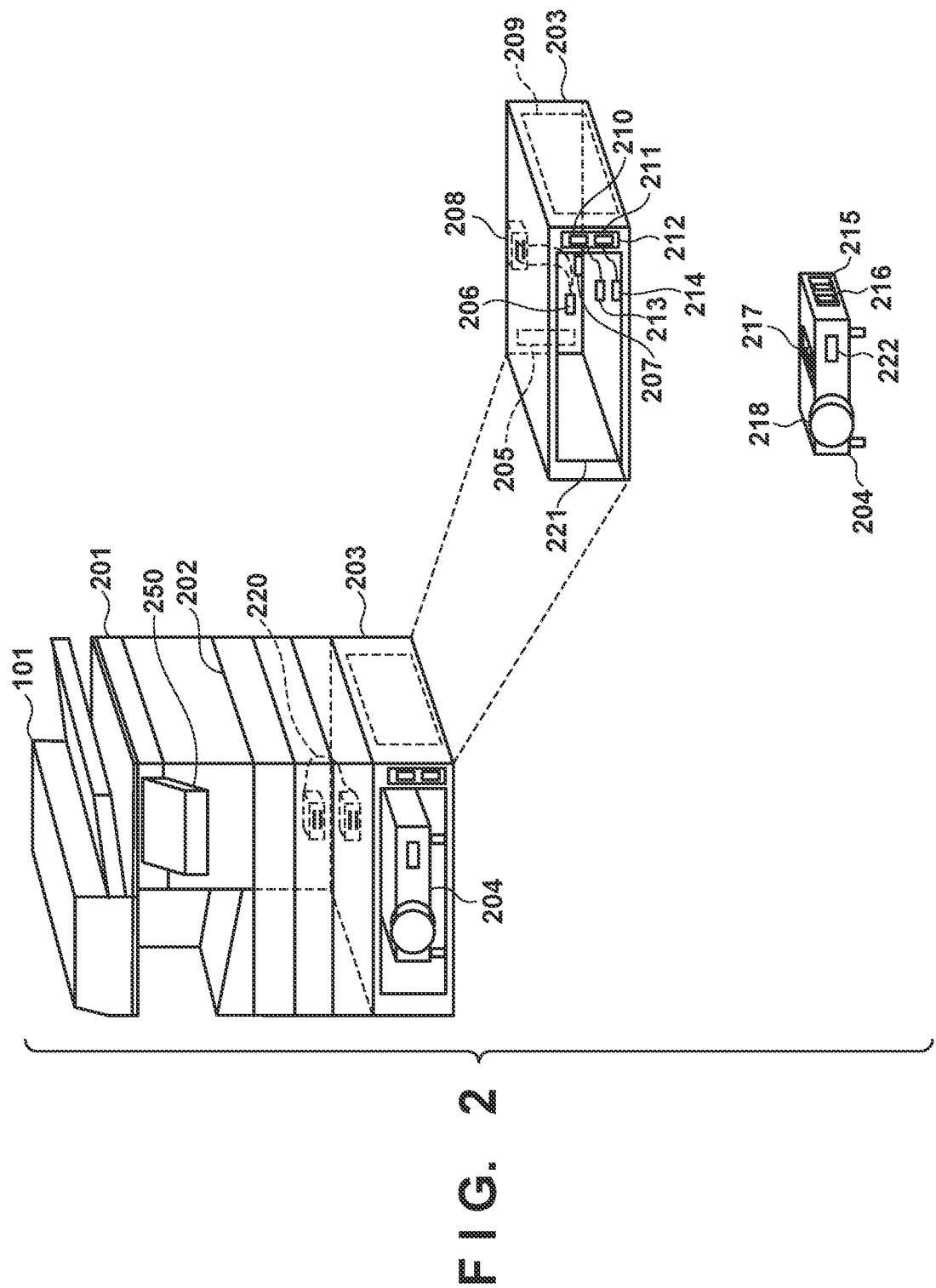
FIG. 2 is a diagram illustrating the installation of a projector expansion unit 203 according to an embodiment.

A projector expansion unit 203 provided in the MFP 101 according to the present embodiment will be described next with reference to FIG. 2. As illustrated in FIG. 2, the MFP 101 is configured including the reader function unit 201 which reads an image from a document, the printer function unit 202 which forms images, and the projector expansion unit 203. The projector expansion unit 203 is connected to the printer function unit 202. In the projector expansion unit 203, a projector (projection unit) 204 is installed within a front cutout 221 when the front cutout 221 is in an open state, as illustrated in FIG. 2. A right-side cutout opening 209 may also be provided in the projector expansion unit 203. Likewise, the projector 204 may be installed with a rear cutout or a left-side cutout (not shown) provided as well. However, it is preferable that a cutout be provided only one location, and that when a plurality of cutouts are provided, the cutouts which are not being used are covered by a cover member or the like. In this manner, the MFP 101 according to the present embodiment has a built-in projector 204, and as illustrated in FIG. 2, the configuration may be such that the projector 204 and the reader function unit 201, the printer function unit 202, and the like are arranged vertically in a three-dimensional manner. Additionally, embodiments of the present disclosure can also be applied in another configuration, such as one in which the units are arranged horizontally, and the projector 204 may furthermore be provided so as to be movable.

A cutout 212 is a cutout for external input I/F installation on a front side, a cutout 205 is a cutout for external input I/F installation on a rear side, and the cutouts are regions for installing connector units which connect an external input I/F to the projector 204. The external input I/F is provided with connectors for HDMI (registered trademark) (High Definition Multimedia Interface) 210, a projector external input I/F (D-sub) 211, and so on. The cutout 212 or the cutout 205 may be selectively provided depending on the installation situation. A D-sub connector 215 of the projector 204 is connected to a projector external input connector (D-sub) 214 connected from the projector external input I/F (D-sub) 211. An HDMI connector 216 of the projector 204 is connected to a projector external input connector (HDMI) 213 connected from the projector external input I/F (HDMI) 210.

When having the projector 204 project an image of an application displayed in a PC 105, a D-sub connector of the PC 105 is connected to the projector external input I/F (D-sub) 211 using a D-sub cable. This makes it possible to display an image in the projector 204 by outputting the image from the PC 105. When connecting from the PC 105 using HDMI, an image of the PC 105 can be displayed by making the connection using the projector external input I/F (HDMI) 210. On the other hand, when connecting the projector 204 to the PC 105 over WiFi, computer images are input from the PC 105 through a wireless antenna 442 connected to a controller unit 400 of the MFP 101 and a wireless LAN 441 (described later).

The projector expansion unit 203 is connected to the printer function unit 202 using an expansion function cable 220 extended from the rear side of the printer function unit 202 of the MFP 101. The expansion function cable 220 is constituted by two types of cables, namely a projector control cable 206 and a projector projection image cable 207. The expansion function cable 220 is connected to an MFP connection connector 208 of the projector expansion unit 203 and is input to the built-in projector control unit illustrated in FIG. 6. The projector control unit in FIG. 6 determines the signals flowing in the projector control cable 206 and the projector projection image cable 207 input from the MFP 101, and outputs an image signal to the projector 204.

The signals flowing in the projector control cable 206 and the projector projection image cable 207 connected to the MFP connection connector 208 are generated by the controller unit 400 illustrated in FIG. 4. The reader function unit 201 and the printer function unit 202 are connected to the controller unit 400, and the reader function unit 201, the printer function unit 202, and an operation unit 250 for operating and issuing control instructions to the projector expansion unit 203 are connected to the controller unit 400. When a key 711 illustrated in FIG. 7A1 is operated in the operation unit 250, the projector expansion unit 203 operates according to control commands sent from the controller unit 400 over the projector control cable 206. Furthermore, the projector expansion unit 203 projects the image signal sent over the projector projection image cable 207 using the projector 204. On the other hand, when a key 712 illustrated in FIG. 7A2 is operated, image data is set to the printer function unit 202 over the projector projection image cable 207 and an image is formed on a storage medium, in accordance with control commands sent from the controller unit 400 over the projector control cable 206. A projector power key 222 is a key that can turn on the projector 204, and even when the MFP 101 is turned off, it is possible to use the projector 204 alone by turning on the projector power key 222.

Reader Function Unit and Printer Function Unit

Figure 3:
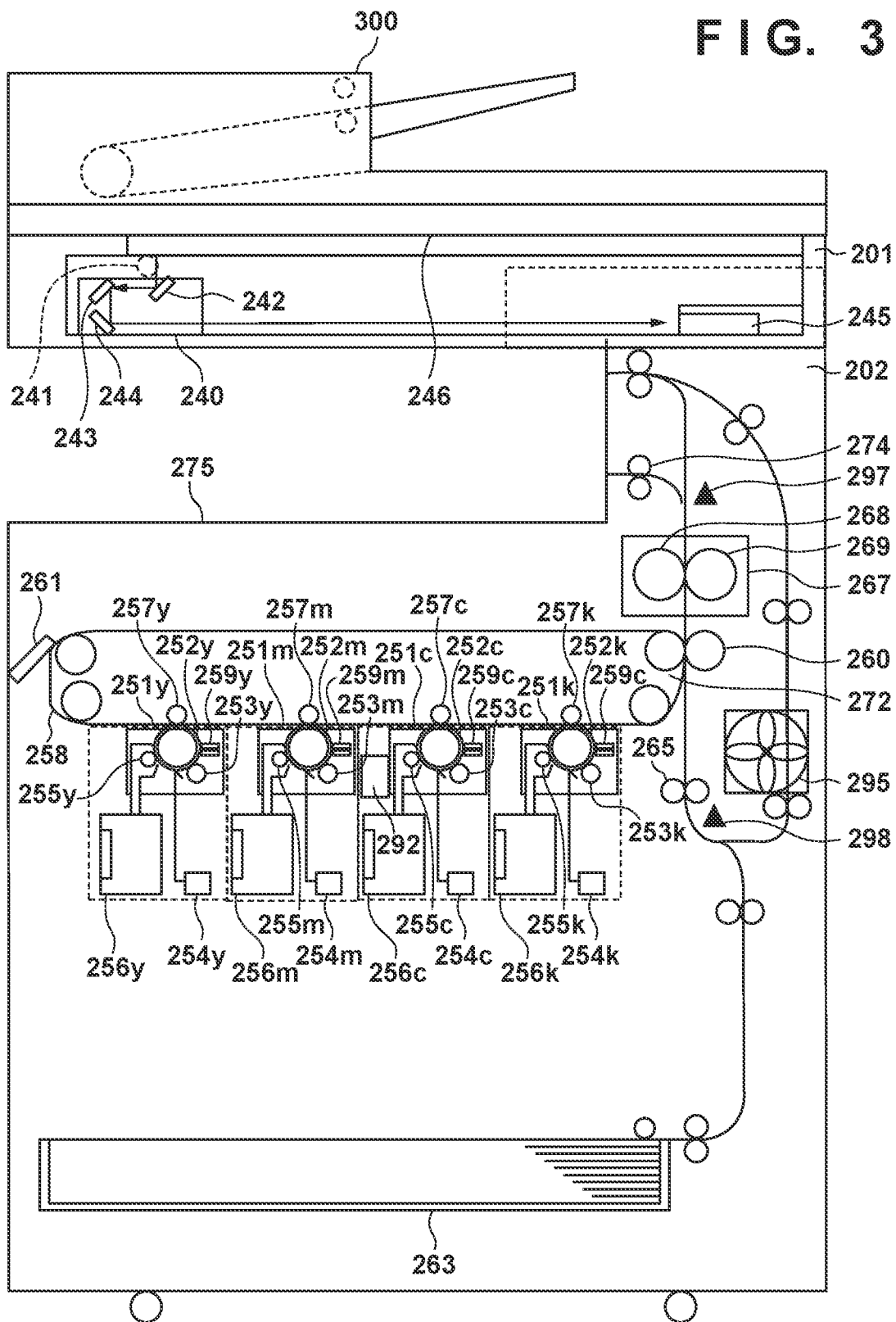
FIG. 3 is a diagram illustrating a reader function unit 201 and a printer function unit 202 according to an embodiment.

The reader function unit 201 and the printer function unit 202 according to the present embodiment will be described next with reference to FIG. 3.

The reader function unit 201 will be described first. A document loaded in a document feeding apparatus 300 is sequentially conveyed one sheet at a time onto a document platform glass surface 246. When the document is conveyed to a predetermined location of the document platform glass surface 246, a lamp 241 of a scanner unit 240 turns on, and the scanner unit 240 moves to irradiate the document with light. Reflected light from the document enters a CCD image sensor unit 245 (called a "CCD" hereinafter) via mirrors 242, 243, and 244.

The printer function unit 202 will be described next. The printer function unit 202 is provided with process units $251y$, $251m$, $251c$, and $251k$, which are arranged in a straight line substantially horizontally at regular intervals. The process units $251y$, $251m$, $251c$, and $251k$ form toner images using yellow (y), magenta (m), cyan (c), and black (k) developing agents, respectively. The toner images formed by the process units $251y$, $251m$, $251c$, and $251k$ undergo primary transfer to an intermediate transfer belt 258 that comes into contact with those images. Then, the toner images of each color superimposed on the intermediate transfer belt 258 are conveyed and transferred onto paper, which is synchronized by a resist roller 265 (described later), at a nip where a drive roller 272 and a secondary transfer roller 260 come into contact with each other. Each of the process units $251y$, $251m$, $251c$, and $251k$ includes a photosensitive drum 252, a charging roller 253, a laser exposure apparatus 254, a developer 255, a toner receptacle 256, and an auxiliary charging brush 259. In FIG. 1, the symbols y, m, c, and k are added to the end of each reference sign to indicate the respective colors.

The printer function unit 202 also includes primary transfer rollers 257y, 257m, 257c, and 257k, the intermediate transfer belt 258, the secondary transfer roller 260, a transfer cleaning apparatus 261, a paper feed cassette 263, and the resist roller 265. The printer function unit 202 also includes a fixing apparatus 267, the drive roller 272, a pre-resist conveyance sensor 298, and a conveyance sensor 297. The fixing apparatus 267 includes a fixing roller 268 and a pressure roller 269. The operations of these components will be described later.

Control Configuration of Printer Function Unit 202

Figure 5:
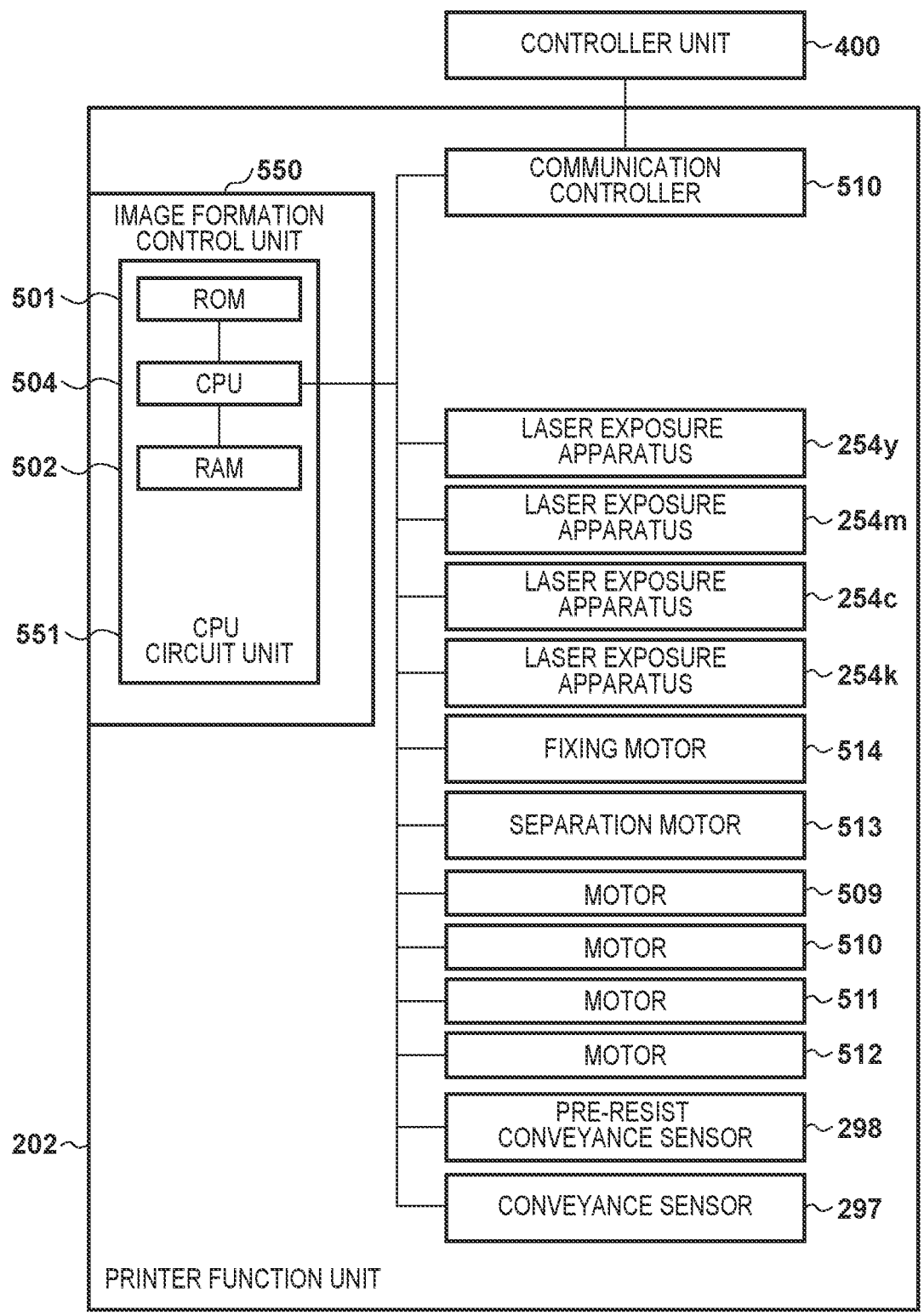
FIG. 5 is a diagram illustrating a control system of the printer function unit 202 according to an embodiment.

A configuration pertaining to control of the printer function unit 202 according to the present embodiment will be described next with reference to FIG. 5. The printer function unit 202 mainly includes a communication controller 510, an image formation control unit 550, and loads 254, 297, 298, and 509 to 512. The image formation control unit 550 includes a CPU circuit unit 551 constituted by a CPU 504, ROM 501, and RAM 502 for controlling each load involved in image formation.

In image formation operations, first, the communication controller 510 receives an instruction to start image formation from the controller unit 400, and communicates that instruction to the CPU circuit unit 551. Upon receiving the instruction to start image formation, the CPU circuit unit 551 acquires data of job information. The content of the job information will be described later with reference to FIG. 8. The CPU circuit unit 551 then stores the job information in the RAM 502 and executes a program stored in the ROM 501. Then, the CPU circuit unit 551 controls the laser exposure devices 254y, 254m, 254c, and 254k, motors 509 to 512, a separation motor 513, and a fixing motor 514 in order to execute the image formation operations described below.

The motor 512 is a motor that drives the photosensitive drum 252k and the developer 255k. Like the motor 512, the motors 509 to 511 are motors that drive the photosensitive drums 252y, 252m, and 252c and the developers 255y, 255m, and 255c, respectively. The separation motor 513 is a motor for controlling the contact and separation of the intermediate transfer belt 258 and the process units 251y, 251m, 251c, and 251k. The fixing motor 514 is a motor that drives the fixing roller 268 and the pressure roller 269. When the image formation operations end, the CPU circuit unit 551 deletes the job information that had been stored in the RAM 502.

Controller Unit

Figure 4A:
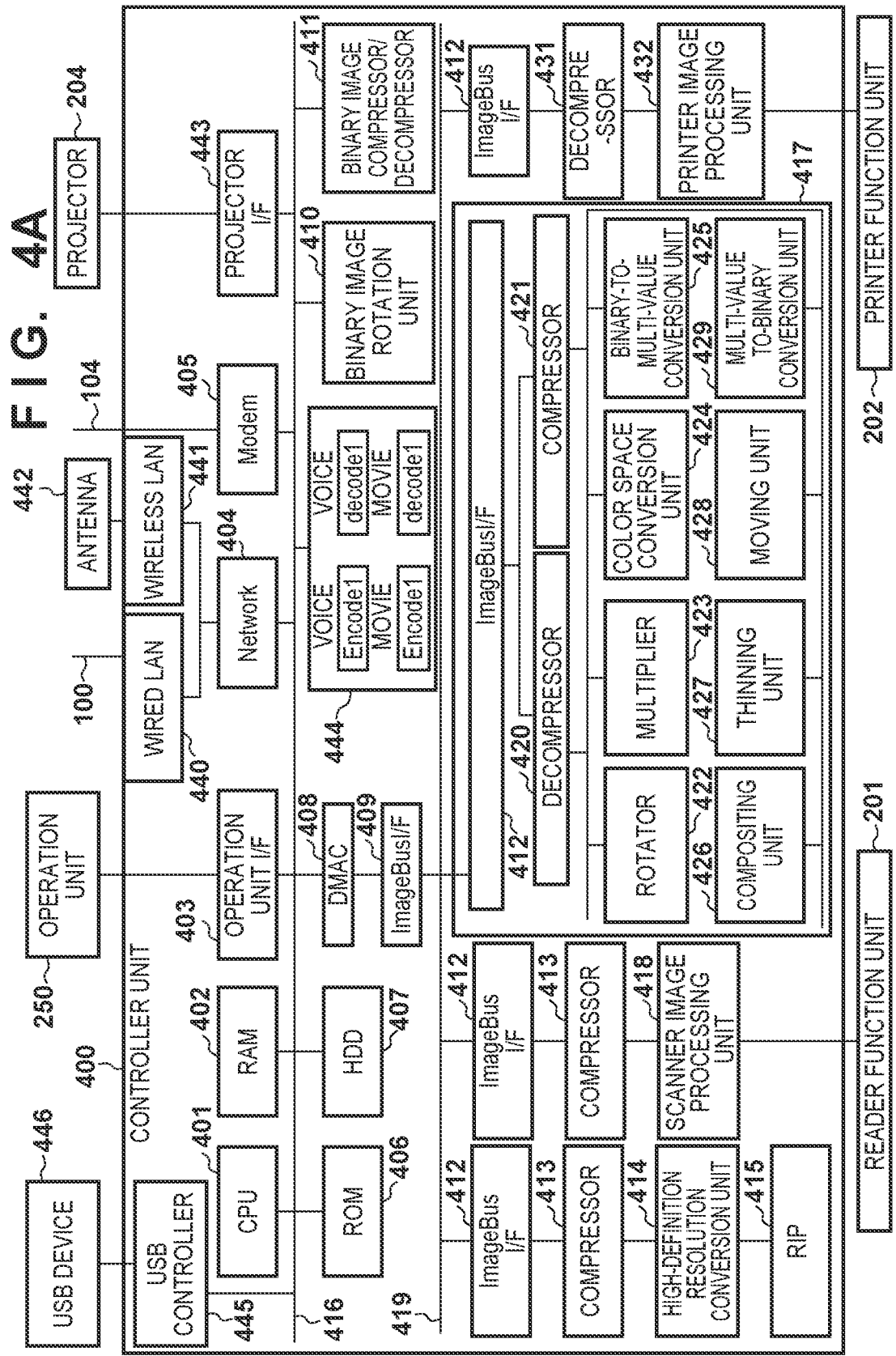
FIG. 4A is a diagram illustrating a controller unit 400 according to an embodiment.

A control configuration of the MFP 101 according to the present embodiment (the controller unit) will be described next with reference to FIG. 4A. As described with reference to FIG. 2, the MFP 101 includes the reader function unit 201, which is an image input device, the printer function unit 202, which is an image output device, the controller unit 400, and the operation unit 250, which is a user interface. The reader function unit 201, the printer function unit 202, and the operation unit 250 are connected to the controller unit 400, and the controller unit 400 is connected to a network transmission unit such as a LAN 100, the public line 104, and the like. Transmission by G3 and G4 faxes, including color image transmission, is possible from the public line. The PC 103 is also connected over the LAN 100 and can send and receive files using the FTP and SMB protocols, and send and receive emails.

Figure 11B:
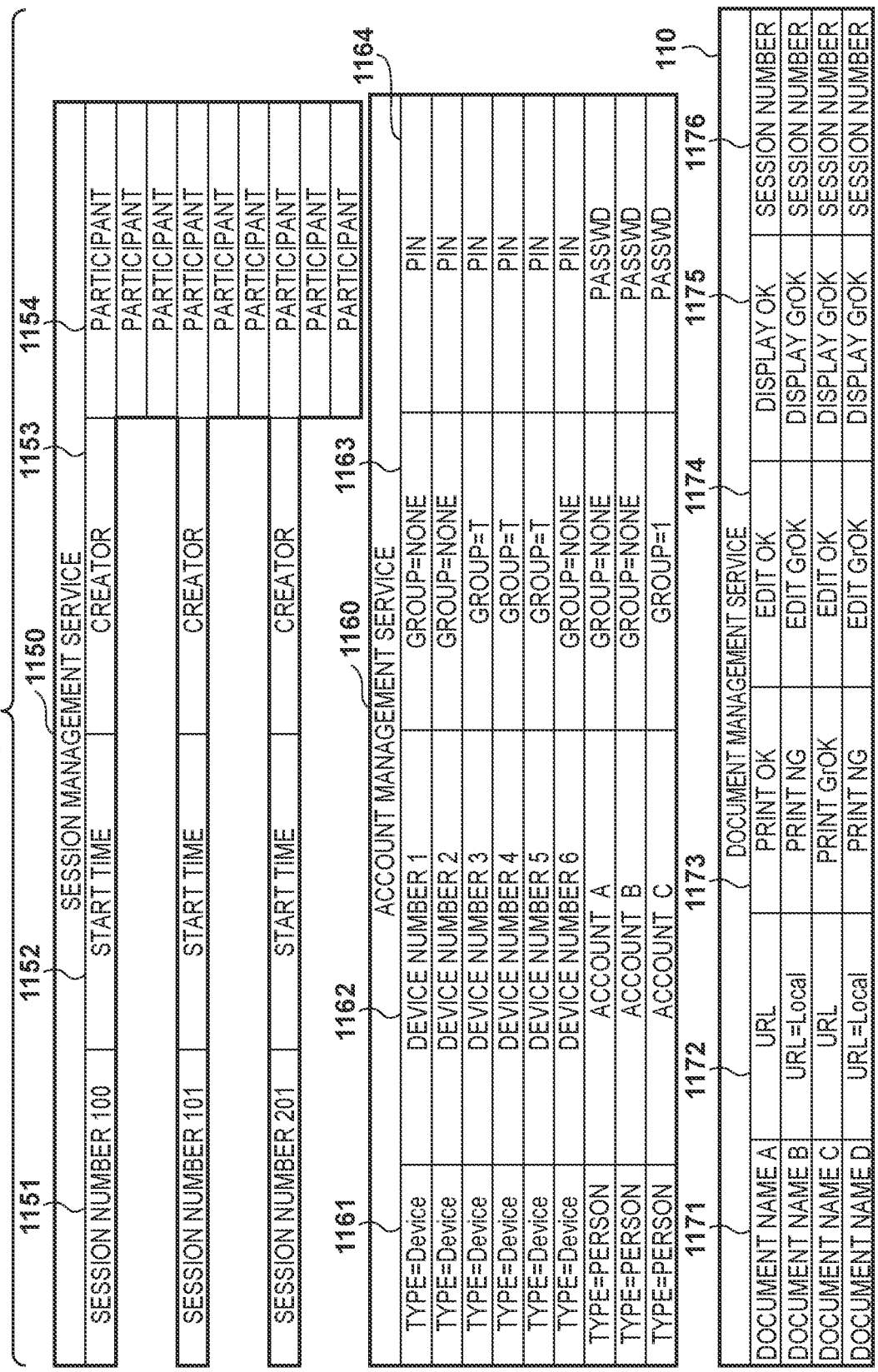
FIG. 11B is a diagram illustrating an example of the functional configuration of each of apparatuses according to an embodiment.

The controller unit 400 is connected to the reader function unit 201, which is an image input device, and the printer function unit 202, which is an image output device. On the other hand, the controller unit 400 is also connected to the LAN 100, a public network (WAN) 104, and the like, and can also input and output image information, device information, and the like. The components (devices) included in the controller unit 400 will be described here. A CPU 401 is a controller that controls the system as a whole. RAM 402 is system work memory used for operations by the CPU 401, and is also image memory that temporarily stores image data. ROM 406 is boot ROM, and holds a system boot program. An HDD 407 is a hard disk drive, and stores web conferencing system clients, image data, and the like. An operation unit I/F 403 is an interface unit with the operation unit (UI) 250, and outputs, to the operation unit 250, image data to be displayed in the operation unit 250. The operation unit I/F 403 also plays a role of conveying the information manipulated by a user of the system from the operation unit 250 to the CPU 401. A network module 404 is connected to a wired LAN 440 and the wireless LAN 441, and the wired LAN 440 connects to an external network via the LAN 100 and inputs and outputs information. The wireless LAN 441 connects to the wireless antenna 442 and inputs and outputs information. A modem 405 connects to the public line 104 and inputs and outputs image information. A binary image rotation unit 410 and a binary image compressor/decompressor 411 are used to convert the orientation of a binary image before the image is sent by the modem 405, to convert the image to a predetermined resolution or a resolution that matches the capabilities on the partner side, and so on. The compression and decompression support JBIG, MMR, MR, and MH. A DMAC 408 is a DMA controller that reads images stored in the RAM 402 without going through the CPU 401 and transfers images to an image bus I/F 409. Alternatively, the DMAC 408 writes images from the image bus I/F 409 to the RAM 402 without going through the CPU 401. A projector I/F 443 is connected to the projector 204, and causes images to be projected by inputting image signals to the projector 204. 444 indicates a component that includes encoders and decoders used for audio and moving images for web conferencing. This will be described in detail later with reference to FIG. 11A. The aforementioned devices are connected to a system bus 416.

The controller unit 400 further includes the following components. At least one image bus I/F 412 is an interface for controlling high-speed image input and output via an image bus 419. Each of compressors 413 connected to a corresponding image bus I/F 412 is used for JPEG compression in units of 32×32 pixels before sending the image to the image bus 419. A decompressor 431 connected to the image bus I/F 412 is a decompressor for decompressing images sent over the image bus 419.

A raster image processor (RIP) 415 expands the PDL code from the host computer into a bitmap image (multi-value). Specifically, the CPU 401 first stores the PDL code received via the network module 404 in the RAM 402 through the system bus 416. The CPU 401 converts the PDL to intermediate code and inputs the intermediate code into the RIP 415 again via the system bus 416, where the intermediate code is expanded into a bitmap image (multi-value) by the RIP 415. In the present embodiment, the RIP 415 decompresses the intermediate code into a 1,200 dpi bitmap image. Then, a high-definition resolution conversion unit 414 reduces the resolution of the image data. In the present embodiment, 1,200 dpi data is converted to a 600 dpi signal. This enables conversion to 600 dpi data while retaining phase information of a 1,200 dpi image, and details of this will be given later. In other words, the output is processed to have the expressive power of a 1,200 dpi resolution level even if the output is 600 dpi, for characters (fonts) and line proportions.

A scanner image processing unit 418 performs various types of appropriate image processing (e.g., correction, processing, and editing) on color images, black-and-white images, and so on from the reader function unit 201, and outputs the results (multi-value). Likewise, a printer image processing unit 432 performs various types of appropriate image processing (e.g., correction, processing, and editing) for the printer function unit 202, and outputs the results. During printing, the decompressor 431 performs binary multi-value conversion, and therefore both binary and multi-value output are possible.

An image conversion unit 417 has various types of image conversion functions used to convert images in the RAM 402 and write the images back into the RAM 402 again. A rotator 422 can rotate an image in a unit of 32×32 pixels to a specified angle, and supports binary and multi-value input and output. A multiplier 423 has a function for converting (e.g., from 600 dpi to 200 dpi) or multiply the resolution of an image (e.g., from 25% to 400%). The multiplier 423 reorders the 32×32 pixel image into an image in units of 32 lines before the multiplying. A color space conversion unit 424 converts a multi-value input image into a Lab image using matrix operations and LUTs, e.g., converts a YUV image in the RAM 402 into a Lab image, which is then stored in the RAM 402. This color space conversion unit 424 has a 3×8 matrix operation and a one-dimensional LUT, and can perform publicly-known base-skipping, backlighting prevention, and the like. The converted image is output in a multi-value format. A binary-to-multi-value conversion unit 425 converts a 1-bit binary image into a multi-value 8-bit, 256-tone image. Conversely, a multi-value-to-binary conversion unit 429, for example, converts an 8-bit, 256-tone image in the RAM 402 to a 1-bit, 2-tone image by a method such as error diffusion processing, and stores the image in the RAM 402. A compositing unit 426 has a function of combining two multi-value images in the RAM 402 into a single multi-value image. For example, by compositing a company logo image and the document image in the RAM 402, the company logo can be easily added to the document image. A thinning unit 427 is a unit that performs resolution conversion by thinning out the pixels of a multi-value image, and is capable of outputting ½, ¼, and ⅛ multi-value images. This can be used in conjunction with the multiplier 423 to perform a wider range of magnification and reduction. A moving unit 428 can output an input binary image or multi-value image with an added margin area or with a margin area deleted. The rotator 422, the multiplier 423, the color space conversion unit 424, the binary-to-multi-value conversion unit 425, the compositing unit 426, the thinning unit 427, the moving unit 428, and the multi-value-to-binary conversion unit 429 can operate in conjunction with each other. For example, if a multi-value image in the RAM 402 is to undergo image rotation and resolution conversion, both processes can be performed in conjunction without going through the RAM 402.

Figure 4B:
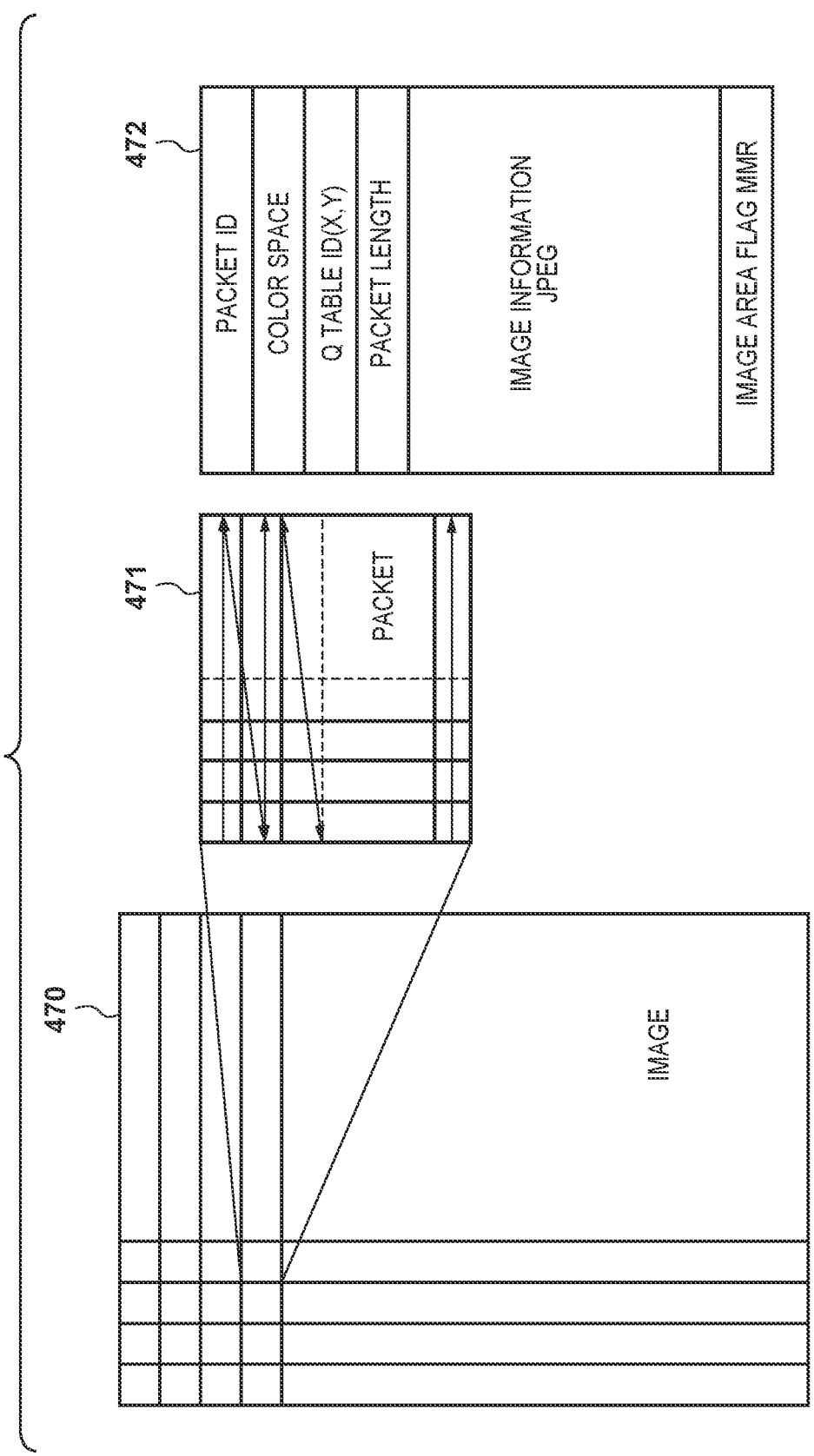
FIG. 4B is a diagram illustrating an image packet structure according to an embodiment.

FIG. 4B illustrates an image format. The format of images according to the present embodiment uses an image packet structure such as that disclosed in Japanese Patent Laid-Open No. 2001-103473. Specifically, in the compressor 413, an image 470 in raster format is reordered as packets 471 in units of 32×32 pixels as illustrated in FIG. 4B, and JPEG compression is performed on each packet. At the same time, information such as an ID indicating a location of the packet, a color space, a Q table ID, a data length, and the like are added to the packet and used as a header. Further still, binary data indicating text and photos (an image area flag) is also compressed in the same way, and is added to the end of the JPEG. 472 indicates the packet data. The decompressor 431 decompresses the JPEG based on this header information and rearranges the data into a raster image. Using such a packet image is very efficient because when rotating the image, only the image inside the packet is rotated, and by changing the position of the packet ID, the image can be rotated with partial decompression and compression. All images flowing on the image bus 419 are packet images. When a raster image is required for FAX transmission, the binary image rotation unit 410, the binary image compressor/decompressor 411, the conversion from a packet image to a raster image is performed by software.

Figure 4C:
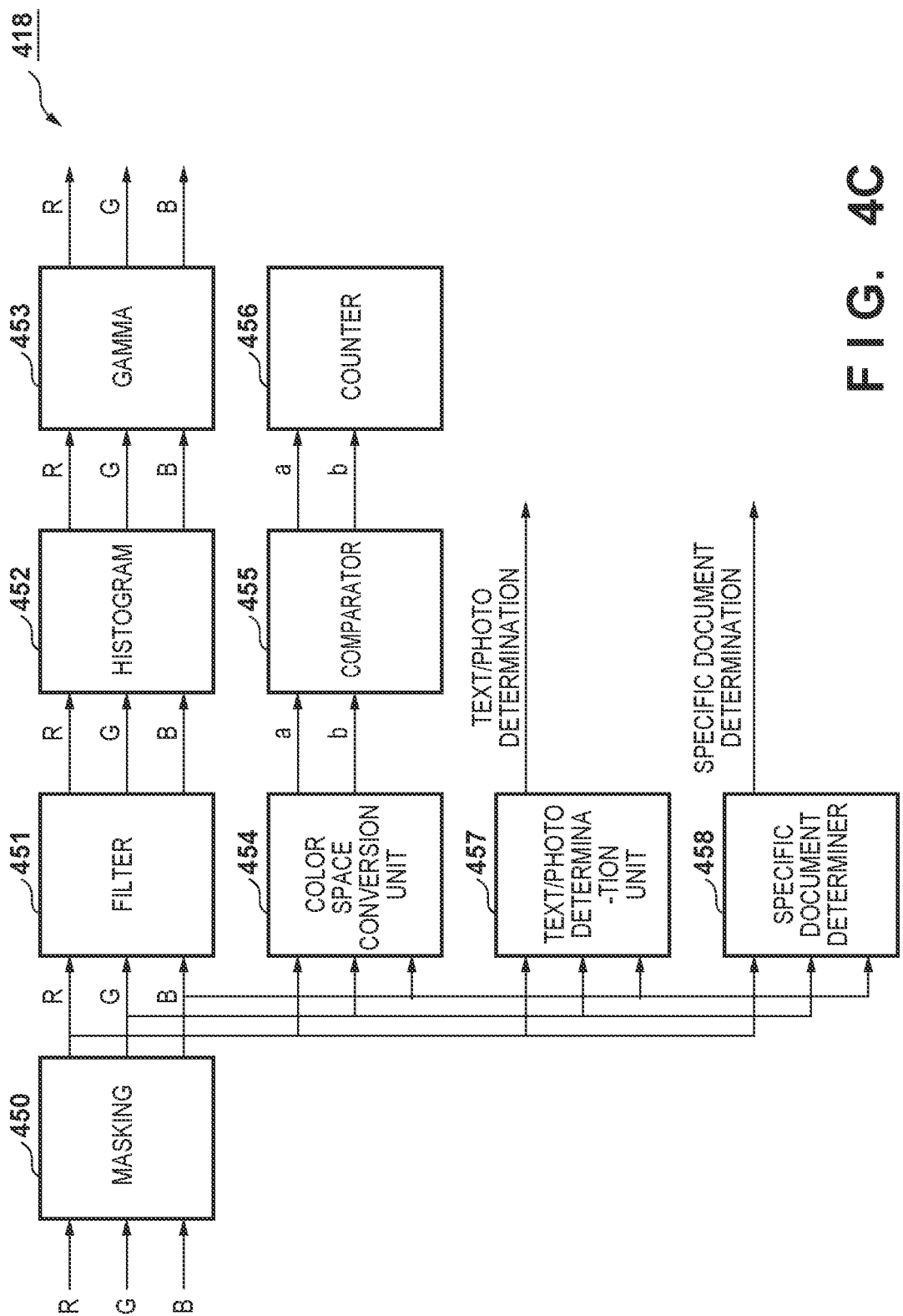
FIG. 4C is a diagram illustrating a scanner image processing unit 418 according to an embodiment.

FIG. 4C illustrates the processing configuration of the scanner image processing unit 418 in detail. 8-bit RGB luminance signals input from a scanner are converted to a standard RGB color signal independent of filter colors of an image sensor by masking 450. A filter 451 uses, for example, a 9×9 matrix to perform processing for blurring the image, sharpening the image, and so on. A histogram 452 is a processing unit that samples the image signal data in the input image, and is used to determine a base level of the input image. This module creates a histogram by sampling the RGB data in a rectangular area defined by start points and end points specified in a main scanning direction and a sub scanning direction, respectively, at a set pitch in the main scanning direction and the sub scanning direction. The created histogram is read out when base-skipping, backlighting prevention, or the like is specified, the base of the document is estimated from the histogram, and a base-skipping level is stored and managed in the RAM 402, the HDD 407, or the like along with the image and is used for image processing during printing or transmission. In gamma 453, processing is performed to increase or reduce the density of the image as a whole. For example, this processing unit converts the color space of the input image to a desired color space, performs correction processing related to the color of the input system, and the like. In order to determine whether a document is color or black-and-white, the image signal before magnification is converted to the publicly-known Lab format by a color space conversion unit 454. The a and b indicated in FIG. 4C represent color signal components. A 1-bit determination signal is output from a comparator 455 as a chromatic color if the component is at least a predetermined level in the comparator 455, and as an achromatic color if not. A counter 456 measures the output from the comparator 455. A text/photo determination unit 457 is a processing unit that extracts text edges from images and separates images into text and photos. A text/photo determination signal is output as the output from this unit. This signal, along with the image, is also stored in the RAM 402 or the HDD 407 and used during printing. A specific document determiner 458 compares the input image signal and a pattern held internally in the determiner to confirm a degree of matching, and outputs a result of the determination, indicating a match or a mismatch. Depending on the determination result, the image can be processed to prevent counterfeiting, such as for banknotes, securities, and the like.

Figure 4D:
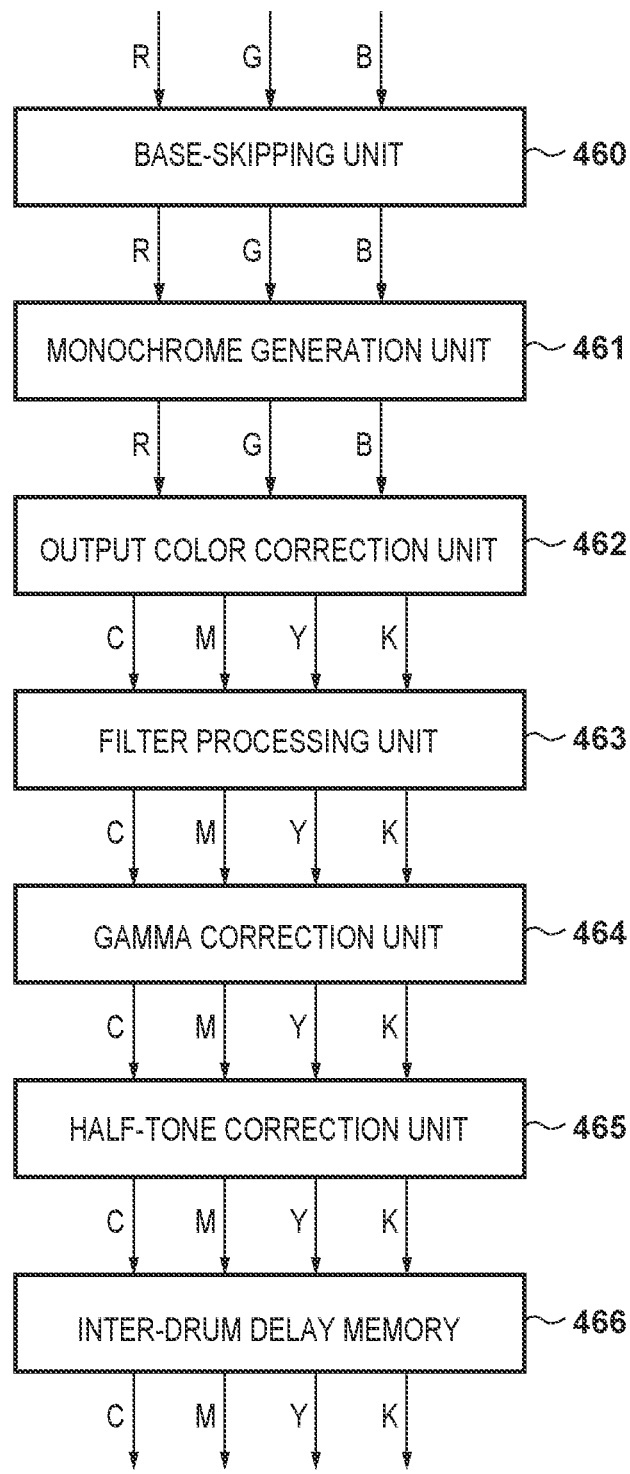
FIG. 4D is a diagram illustrating a printer image processing unit 432 according to an embodiment.

FIG. 4D illustrates the processing configuration of the printer image processing unit 432 in detail. A base-skipping unit 460 skips a base color of image data and removes the unwanted base fogging. For example, a 3×8 matrix operation or a one-dimensional LUT is used for the base-skipping. A monochrome generation unit 461 converts color image data, e.g. RGB data, to gray monochrome data when converting color image data to monochrome data and printing as monochrome. For example, the monochrome generation unit 461 is constituted by a 1×3 matrix operation in which RGB is multiplied by a given constant to produce a gray signal. An output color correction unit 462 performs color correction according to the characteristics of the printer function unit 202 that outputs the image data. The output color correction unit 462 is constituted by processing using, for example, a 4×8 matrix operation, direct mapping, or the like, and generates a six-color CMYKLcLm image signal or a four-color CMYK image signal from the input RGB image signal. In the present embodiment, image signals corresponding to the six toner colors of the printer function unit 202, i.e., cyan (C), magenta (M), yellow (Y), black (K), light cyan (Lc), and light magenta (Lm), are output, each at 600 dpi and 8 bits. Alternatively, image signals corresponding to the four colors of cyan (C), magenta (M), yellow (Y), and black (K) are output at 600 dpi (dots per inch) and 8 bits each. The output of the six-color and four-color image signals is switched through processing which will be described later. A filter processing unit 463 performs desired correction on the spatial frequency of the image data, and is constituted by processing that performs, for example, a 9×9 matrix operation. A gamma correction unit 464 performs gamma correction according to the characteristics of the printer function unit 202 for output, and normally is constituted by a one-dimensional LUT. A half-tone correction unit 465 is a processing section that performs desired half-tone processing according to the number of tones output by the printer function unit 202, and is a half-tone processing unit that performs desired screen processing, such as binarization and conversion to 32-value data, error diffusion processing, and the like. Each of the processing units can also be switched by a text/photo determination signal (not shown). Inter-drum delay memory 466 is memory for superimposing CMYKLcLm images by shifting the printing timings of CMYKLcLm among the drums in a color printer having a drum for each of the CMYKLcLm colors. This delay can be performed to align the images for six colors for each of the colors in a color printer having six drums for each of the CMYKLcLm colors. Of course, when the output of the output color correction unit 462 is the four CMYK colors, the delay can also be adjusted in the inter-drum delay memory 466.

Although the present embodiment uses an electrophotographic printer function unit, the printer function unit is not limited thereto, and an inkjet printer function unit can also be used.

Example of Display in Operation Unit 250

An example of a display made in the operation unit 250 of the MFP 101 according to the present embodiment will be described next with reference to FIGS. 7A1-7A11. The operation unit 250 is provided with various types of key groups for instructing image formation operations, such as the details of image editing, a number of copies, and the like, for the image processing performed by the reader function unit 201, and a liquid crystal display unit 710 that displays details during operations. The operation unit 250 is also provided with a physical key group 720. The physical key group 720 is a variety of types of physical keys. A start key 723 is a key for starting copying, and a home key 722 is a key for returning the display and settings in the liquid crystal display unit 710 to a default state. A sleep key 721 is a key for putting the MFP 101 into a power-saving state.

700 indicates a basic menu screen. The liquid crystal display unit 710 is a touch-sensitive liquid crystal display, and key inputs can be performed by pressing various types of keys displayed in a key display part. A post-reading projector display key 711 is displayed as one of the various types of keys in the key display part. The post-reading projector display key 711 is a key for causing a document loaded in a document feeding apparatus or the reader function unit 201 to be read, converted to image data, transmitted to the projector 204 installed in the projector expansion unit 203, and projected.

When the post-reading projector display key 711 is pressed, a screen 701, in which "projector scan" is displayed in 740, is displayed in the liquid crystal display unit 710. A read key 741, a next page key 742, a previous page key 743, and an end key 744 are also displayed in the screen 701. When the read key 741 is pressed, a command is sent to the system bus 416 through the operation unit I/F 403. Having been notified of the command, the CPU 401 confirms the state of the projector 204 through the projector I/F 443, makes a display request, and furthermore sends the image read by the reader function unit 201 to the projector 204 and causes the image to be displayed by the projector. A next page can be displayed by pressing the next page key 742, and a previous page can be displayed by pressing the previous page key 743. The display of a scanned image ends when the end key 744 is pressed. Note, however, that the present disclosure is not limited thereto, and the same control as that performed when the read key 741 is pressed may be performed in response to the post-reading projector display key 711 being pressed. In other words, control may be performed so that a document is read by the reader function unit 201 and displayed by the projector 204 in response to a one-touch operation made by the user. This makes it possible to simplify user operations, and provide a more user-friendly operation system. Alternatively, a one-touch key corresponding to the above descriptions may be provided separate from the post-reading projector display key 711.

702 indicates a menu screen pertaining to the projector 204. The screen 702 may be transitioned to from the screen 700. In this case, a projector key may be displayed, in a selectable manner, as part of the various types of key groups, in the screen 700 in the liquid crystal display unit 710. In this case, the screen transitions to the screen 702 in response to the projector key being pressed. Note that the projector key may be included in the physical key group 720. The screen 702 includes a projector image print key 712, a settings key 713, a web conference settings key 714, a web conference start/end key 715, and a file display key 716.

When the projector image print key 712 in the screen 702 is pressed, a screen 703, in which "projector printing" is displayed in 745, is displayed. The screen 703 is configured including a copy number settings key 746, a density settings key 747, and a print start key 748. The number of copies to be printed can be set by pressing the copy number settings key 746. The density to be used during printing can be set by pressing the density settings key 747. When the print start key 748 is pressed, the controller unit 400 confirms the state of the projector 204 from the projector I/F 443 through the projector control cable 206. Information indicating whether or not an image is displayed, the resolution of the image, and so on is acquired, and if there is an image being displayed, the CPU 401 sends the image data to the printer function unit 202 and prints the image.

The projector settings key 713 in the screen 702 is a key for making settings for the projector, and when the projector settings key 713 is pressed, manual distortion correction, manual trapezoidal distortion correction, light intensity adjustment, and the like (not shown) can be executed. The web conference settings key 714 is a key for making settings for conducting a web conference, and is a key for acquiring a web conference session from the relay server 106. When acquiring a web conference session, a session confirmation screen 724 is displayed in the liquid crystal display unit 710 in response to the web conference settings key 714 being pressed. In the session confirmation screen 724, a web conference time is displayed in 730, and a web conference time input area is displayed in 731. Furthermore, in the session confirmation screen 724, "session number" is displayed in 732, "210" is displayed in 733 as the session number, and a participant key 734 is displayed in a selectable manner. When a time is input in the web conference time input area 731, a device number held by the MFP 101 and the web conference time are transmitted; as a result, this information is transmitted from the relay server 106, and the session number is displayed in 733 in the liquid crystal display unit 710. When the participant key 734 is pressed, a participant settings screen 726 is displayed. In the participant settings screen 726, "participant setting: 210" is displayed in 770, a participant target is acquired from the relay server 106 from an account management service (described later), and the acquired participant target is displayed in a display area 771. In the example illustrated in FIG. 7A8, the display area 771 displays MFP-A/MFP-B, in which participation is set, and MFP-C, in which participation is not set. MFP-C can also participate in the web conference by selecting MFP-C and pressing an add key 774. Scroll keys 775 and 776 can be pressed to display participant targets which do not fit in the display area 771. Additionally, pressing a start key 772 makes it possible to start a conference even if the start date/time has not yet been reached. Pressing an end key 773 makes it possible to end a conference which has started. A print permission key 735 is a key for making a setting to permit the acquisition of a URL for accessing data pertaining to an image displayed by the projector 204 in order to print the displayed image. This key is a toggle switch, and can be set to "permit" (OK), "prohibit" (NG), and "permit only for groups". The settings are stored in a document management service 1123 through a relay service 1120, from a client 1132 of the web conferencing system, which will be described later. An editing permission key 736 is a button for setting whether to permit or prohibit the editing of a document downloaded from the URL. This key is also a toggle switch, can be set to permit or prohibit, and is stored in the document management service 1123. A display permission key 737 is a key for setting whether to permit, prohibit, or permit only for groups to display images in the projector 204. This key is also a toggle switch, and the result of the setting is stored in the document management service.

At the start of a web conference, a session selection start screen 725 is displayed when the web conference start/end key 715 in the screen 702 is pressed. The session number displayed by pressing the web conference settings key 714 is displayed in a session number input area 761. When a corresponding session number is input in this area and a session start key 762 is pressed, the session number, start time, and device number of the MFP are communicated to a session management service (described later), and if there is a match, the web conference can be started. A session which has been started can be ended by pressing a session end key 770. When it is necessary to print a displayed screen while the web conference is underway, if printing is set to "permit", pressing a print key 764 transitions the screen to a screen 727. If printing is set to "prohibit", the print key 764 may be displayed so that the key cannot be selected, or may not be displayed at all. When selected, a message indicating that printing is set to "prohibit" may be displayed, as indicated in a screen 728 (described later).

Print settings can be made in the screen 727. When a key 784 to instruct printing of the current page only is pressed, an MFP image input/output unit 696, which has a screen capture function, operates, and the screen capture image is printed by the printer function unit 202. When a multi-page key 785, a key 786 for printing after deleting unnecessary portions, or the like is pressed, the web conference system client 1132 sends a URL acquisition request to the relay service 1120. The relay server 106 makes a query to the document management service 1123. The document management service 1123 refers to an account management service 1122, and if printing is possible, the screen transitions to a screen 729 and a URL where the screen capture image data can be accessed is communicated. If the file format described in the URL is an image format that can be expanded and printed by the MFP 101 (PDF, JPEG, or the like), pressing a print key 783 expands the image, which is then printed by the printer function unit 202. If printing is not possible, the screen transitions to the screen 728, and the reason why printing is not possible is displayed in a display area 790. In this case, as indicated by 791, the reason is that there are no access rights, which is displayed as "no access rights". Note that with the above-described URL, the file data itself of conference materials or the like currently projected by the projector 204 may be made accessible. The accessibility of such file data may be changed according to settings pertaining to user access rights, access restrictions, and the like.

When the file display key 716 of the projector is pressed in the screen 702, a screen 704, in which a projector file screen is displayed in 750, is displayed in the liquid crystal display unit 710. The screen 704 is configured including a URL setting key 751, a URL display area 752, a display key 753, a next page key 754, a previous page key 755, and an end key 756. By pressing the URL setting key 751, whether to use an external server or an internal file system can be selected, and if the external server is selected, the file to be displayed by the projector 204 can be specified in the URL display area 752. By pressing the display key 753, the CPU 401 is notified of commands via the system bus 416 with respect to data that has been converted into an image by an image expansion unit (described later). Having been notified of the command, the CPU 401 confirms the state of the projector 204 through the projector I/F 443, makes a display request, sends the image to the projector 204, and instructs the projector to display the image. A next page can be displayed by pressing the next page key 754, and a previous page can be displayed by pressing the previous page key 755. The display of the file ends when the end key 756 is pressed.

Remote Operation Unit

A remote operation unit that implements the operation unit 250 according to the present embodiment through software on an external PC will be described next with reference to FIGS. 9A to 9C. The remote operation unit is realized by displaying a screen, which is displayed in the operation unit 250 of the MFP 101, in the display of the PC 103, which is an external PC, and receiving user inputs made through the displayed screen. The PC 103 performs network communication with the MFP 101 over the network 100, and outputs a request for the remote operation unit in the Hypertext Transfer Protocol (HTTP) format. The network 100 is connected to the network module 404, which is capable of Internet communication with the controller unit 400 of the MFP 101, and the request for the remote operation unit is communicated to the controller unit 400 through the network module 404.

Having received the request for the remote operation unit in the PC 103, the controller unit 400 sends screen information of a user authentication screen 90a to the external PC. If the request is received from an external tablet or mobile device (not shown), screen information of a user authentication screen 90b having a modified layout is sent to the external mobile device. Hereinafter, it is assumed that when accessed from a mobile device, the layout is modified before being sent to the external tablet or mobile device. The following descriptions will take screens 90a to 99a and 99c in the external PC as an example. The corresponding screens 90b to 99b and 99d displayed in the external mobile device correspond to the screens 90a to 99a and 99c, respectively, and because only the layout is modified, the screens 90b to 99b and 99d will not be described.

When the input of a username 903 and a password 904 are accepted in the user authentication screen 90a from the PC 103, the input information is sent to the MFP 101 as authentication data, and the controller unit 400 determines whether or not that data matches data which is already held. If the data matches, a top-level screen 91a of the remote operation unit is sent to the PC 103. The top-level screen 91a includes a device state confirmation key 906 and a consumables state confirmation key 908. When the device state confirmation key 906 is entered on the PC 103, the software on the PC 103 sends a request for state information of the printer function unit 202, the reader function unit 201, the projector 204, and the modem 405 to the MFP 101 over the network. When state information communicated in response to the request is received, a browser of the PC 103 displays the state information in a state display area 907. Likewise, when the consumables state confirmation key 908 is entered, information is acquired from the MFP 101 and displayed in a display area 909. A projector print key 911, a projector scan key 912, a projector settings key 913, a web conference start key 914, a web conference settings key 915, and a projector file display key 916 are provided in the top-level screen 91a as functions 910.

When the projector scan key 912 is pressed, a screen 92a, in which "projector scan" is displayed in 920, is displayed, and a read key 921, a next page key 922, a previous page key 923, and an end key 924 are displayed. When the read key 921 is pressed, a command is sent to the MFP 101 over the network 100. Having been notified of the command, the CPU 401 confirms the state of the projector 204 through the projector I/F 443, makes a display request, and furthermore sends the image read by the reader function unit 201 to the projector 204 and causes the image to be displayed by the projector. A next page can be displayed by pressing the next page key 922, and a previous page can be displayed by pressing the previous page key 923. The display of a scanned image ends when the end key 924 is pressed.

When the projector print key 911 is pressed, a screen 93a, in which "projector printing" is displayed in 930, is displayed, and a copy number settings key 931, a density settings key 932, and a print start key 933 are displayed. The number of copies to be printed can be set by pressing the copy number settings key 931. The density for printed materials can be set by pressing the density settings key 932. When the print start key 933 is pressed, a command is sent to the MFP 101 over the network 100, and the controller unit 400 confirms the state of the projector 204 from the projector I/F 443 through the projector control cable 206. The controller unit 400 acquires information indicating whether or not an image is displayed, the resolution of the image, and so on, and if there is an image being displayed, the image data is sent to the printer function unit 202, which prints the image.

The web conference settings key 915 is a key for making settings for conducting a web conference, and is a key for acquiring a web conference session from the relay server 106. When acquiring a web conference session, a session confirmation screen 96a including displays 960 to 965 is displayed in response to the web conference settings key 915 being pressed. In the session confirmation screen 96a, the conference time is displayed in 961 and an input area is displayed in 962, which are located under web conference settings, indicated by 960. When the conference time is input in the input area 962, the MFP 101 sends the device number which is held and the web conference time. As a result, that information is sent to the PC 107 of the web conferencing system via the relay server 106, and a response including the session information is received. Once the response is received, the MFP 101 notifies the PC 103 of the screen information or the session information, and causes the session number to be displayed in a display area 964. When a participant key 965 is pressed, a screen 97a is displayed, and participant targets are acquired from an account management service (described later) of the relay server 106 and displayed in a display area 971. In the example in FIGS. 9B1 to 9B4, MFP-A/MFP-B, which are set to participate, and MFP-C, which is not set to participate, are displayed in the display area 971. MFP-C can also participate in the web conference by selecting MFP-C and pressing an add key 976. Scroll keys 977 and 978 can be pressed to display participant targets which do not fit in the display area 971. Here, pressing a start key 975 makes it possible to start a web conference even if the start date/time has not yet been reached. Pressing an end key 974 makes it possible to end a web conference which has started.

The descriptions will now return to the session confirmation screen 96a. A print permission key 966 is a key for making a setting to permit the acquisition of a URL for printing an image displayed in the projector 204. This key is a toggle switch, and can be set to "permit", "prohibit", and "permit only for groups". The settings are stored in the document management service 1123 through the relay service 1120, from the web conference system client 1132. An editing permission key 967 makes it possible to set whether to permit or prohibit the editing of a document downloaded from the URL. This key is also a toggle switch, can be set to permit or prohibit, and is stored in the document management service 1123. A display permission key 968 is a key for setting whether to permit, prohibit, or permit only for groups to display images in the projector 204. This key is also a toggle switch, and the result of the setting is stored in the document management service.

When the web conference start key 914 in the top-level screen 91a is pressed, a session selection start screen 95a, including displays 950 to 958, is displayed. In a screen 95a, "session number" is displayed in 951, and session numbers which can be selected are displayed in a selectable manner in an input area 952. When a corresponding session number is input (selected) and a session start key 956 is entered, the session number, the start time, and the device number of the MFP 101 are communicated to a session management service (described later). Then, it is determined if there is a match, and if so, the web conference is started. Additionally, scroll keys 957 and 958 can be pressed to display session numbers which do not fit in the display area 971. Here, when the start key 956 is pressed, the web conference can be started through a session. Pressing an end key 955 makes it possible to end a session which has started.

Additionally, when printing is set to "permit" and it is necessary to print a displayed screen while the web conference is underway, the user can print the screen by pressing a print key 959. A print settings screen 98a is displayed when the print key 959 is pressed. When a key 983 for printing the current page is pressed in the print settings screen 98a, the MFP image input/output unit 696 operates, and the screen capture image is printed by the printer function unit 202. When a multi-page key 986, a key 985 for printing after deleting unnecessary portions, or the like is pressed, the web conference system client 1132 sends a URL acquisition request to the relay service 1120. The relay server 106 makes a query to the document management service 1123. The document management service 1123 refers to the account management service 1122, and if printing is possible, communicates the URL. Having been notified of the URL, the MFP 101 changes the screen to a screen 99c, and displays the URL. An indication to access the URL is displayed in 992, and an address for an access destination is displayed in an area 994 displayed below a URL 993. If the file format described in the URL of the access destination is an image format that can be expanded and printed by the MFP 101 (PDF, JPEG, or the like), pressing a print key in 984 expands the image, which is then printed by the printer function unit 202. If printing is not possible, the screen transitions to a screen 99a, an indication that printing is not possible is displayed in a display area 990, and the reason is displayed in 991. In this case, the reason is that there are no access rights, which is displayed as "no access rights". Note that with the above-described URL, the file data itself of conference materials or the like currently projected by the projector 204 may be made accessible. The accessibility of such file data may be changed according to settings pertaining to user access rights, access restrictions, and the like.

When the projector file display key 916 is pressed, a screen 94a, in which "projector file display" is displayed in 940, is displayed, and a URL selection key 941, a URL display area 942, and a display key 943 are displayed. Furthermore, a next page key 944, a previous page key 945, and an end key 946 are displayed in the screen 94a. When the URL selection key 941 is pressed, whether to use an external server or an internal file system can be selected, and if the external server is selected, the file to be displayed by the projector 204 can be specified in the URL display area 942. By pressing the display key 943, the CPU 401 is notified of commands via the system bus 416 with respect to data that has been converted into an image by an image expansion unit (described later). Having been notified of the command, the CPU 401 confirms the state of the projector 204 through the projector I/F 443, makes a display request, sends the image to the projector 204, and instructs the projector to display the image. A next page can be displayed by pressing the next page key 944, and a previous page can be displayed by pressing the previous page key 945. The display of the file ends when the end key 946 is pressed.

Printer Function Unit Pre-Preparation Operations

Pre-preparation operations for putting the printer function unit 202 into a state in which image formation operations are possible will be described next with reference to FIGS. 3 and 5. The pre-preparation operations are preparation operations performed before receiving an image formation start signal from the controller unit 400. Accordingly, the CPU 504 of the image formation control unit 550 starts driving the motors 509 to 512 in preparation for image formation start signals for both monochromatic images and color images. Here, when the motors 509 to 512 are driven, the developers 255y, 255m, 255c, and 255k and the photosensitive drums 252y, 252m, 252c, and 252k are rotationally driven. When the speeds of the motors 509 to 512 rise to a constant speed, the CPU 504 drives the separation motor 513 to bring the intermediate transfer belt 258 into contact with the process units 251y, 251m, 251c, and 251k. Furthermore, the CPU 504 charges the photosensitive drums 252y, 252m, 252c, and 252k to a negative polarity. Then, in the pre-preparation operations when the power is turned on or when returning from the power-saving mode, image density correction control to make the image density constant, color shift correction control, and the like are performed if the internal state of the printer function unit 202 has changed due to remaining idle for a long period of time. Additionally, in operations for returning after a jam occurs, cleaning control is performed to remove toner remaining on the intermediate transfer belt 258 and the photosensitive drums 252y, 252m, 252c, and 252k. Any method may be used for the image density correction control, the color shift correction control, and the cleaning control, and thus these will not be described in detail. Note that if the intermediate transfer belt 258 and the process unit 251k are in contact with each other when a jam occurs, the cleaning control may be used to remove toner remaining in the intermediate transfer belt 258 and the photosensitive drum process unit 251k in the operation for returning after the jam. In other words, the cleaning control need not be performed for the photosensitive drums 252y, 252m, and 252c.

Image Formation Operations by Printer Function Unit

Basic image formation operations performed when an image formation request is received while the printer function unit 202 is in a standby state with operations stopped will be described next with reference to FIGS. 3 and 5. Upon receiving the image formation start signal, the CPU 504 starts driving the motor 512. Here, when the motor 512 is driven, the developer 255k and the photosensitive drum 252k are rotationally driven. When the speed of the motor 512 rises to a constant speed, the CPU 504 drives the separation motor 513 to bring the intermediate transfer belt 258 into contact with the process unit 251k. Furthermore, the photosensitive drum 252k is charged to a negative polarity. The laser exposure apparatus 254k then emits the image signal input from the exterior from a laser light emitting unit to form an electrostatic latent image on the photosensitive drum 252k.

The developer 255k is applied with a developing bias of the same polarity as the charging polarity of the photosensitive drum 252k (negative polarity), which causes black toner to adhere to the electrostatic latent image formed on the photosensitive drum 252k and visualizes the image as a toner image. In primary transfer, a primary transfer bias (of the polarity opposite from the toner, i.e., positive polarity) is applied to the primary transfer roller 257k. At this time, the toner image on the photosensitive drum 252k undergoes primary transfer to the intermediate transfer belt 258, which is being driven, in a state where the primary transfer roller 257k is pressed against the photosensitive drum 252k with the intermediate transfer belt 258 therebetween.

The toner image on the intermediate transfer belt 258 is transferred to a secondary transfer section between the drive roller 272 and the secondary transfer roller 260. In accordance with the timing at which the leading end of the toner image moves to the secondary transfer section, the storage medium, such as paper, fed by the paper feed cassette 263 passes through a conveyance path formed substantially vertically, and is conveyed to the secondary transfer section by the resist roller 265. The toner image is transferred at once to the storage medium conveyed to the secondary transfer section by the secondary transfer roller 260 to which a secondary transfer bias (of the polarity opposite from the toner, i.e., positive polarity) is applied. Residual toner remaining on the intermediate transfer belt 258 after the secondary transfer is scraped off by the transfer cleaning apparatus 261, and is conveyed and collected as recovered toner. The storage medium on which the toner image is formed is conveyed to the fixing apparatus 267, which is located downstream from the secondary transfer section. The toner image formed on the storage medium is heated and pressurized at a fixing nip section between the fixing roller 268 and the pressure roller 269, and is thermally fixed to the surface of the storage medium. The series of image formation operations is completed through the operations described above.

Additionally, when image formation start signals for forming a color image are received, the CPU 504 drives the separation motor 513 and brings the intermediate transfer belt 258 into contact with the process units 251y, 251m, 251c, and 251k. Thereafter, image formation operations for each color are performed in the same way as for monochromatic images.

Job Information

Figure 8:
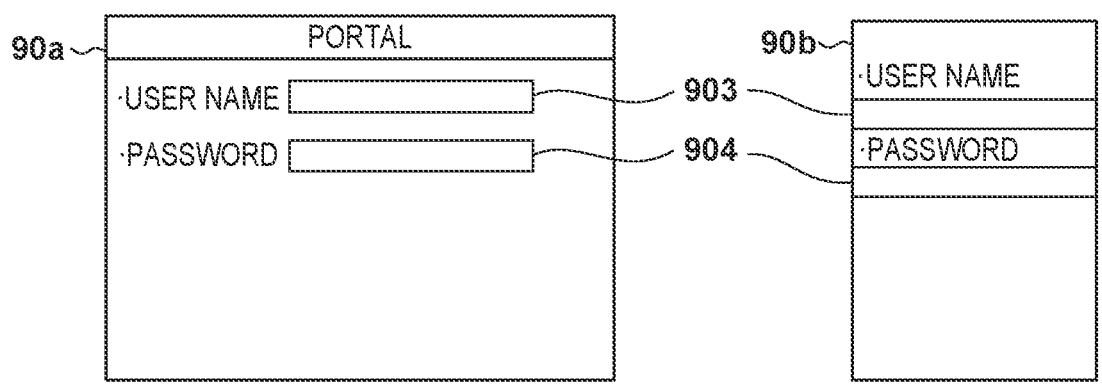
FIG. 8 is a diagram illustrating job information used by the control system of the printer function unit 202 according to an embodiment.

The job information will be described next with reference to FIG. 8. Job information 800 is configured including job presence/absence 801, a number of pages 802, and per-page color data 803. The example in FIG. 8 illustrates job information for a job in which the first page is a monochromatic image, the second page is a color image, and the third page is a color image. In other words, in the job information 800, the job presence/absence 801 indicates "present", the number of pages 802 is set to three pages, and monochromatic, color, and color are stored as the per-page color data 803.

Accordingly, when there is data in the job presence/absence 801, it can be determined that job information is stored. In addition, by confirming the color of each page only for the number of pages 802, it is possible to determine whether or not a job includes color pages. Note that when a plurality of instructions to start image formation for a job are received, the job information is handled collectively, and the number of pages and the color for each page are updated.

Projector

The projector according to the present embodiment will be described next with reference to FIG. 6. The present embodiment will describe a projector that uses a transmissive liquid crystal panel as an example of a projection apparatus. However, the present disclosure is not limited to a projector that uses a transmissive liquid crystal panel as a display device. For example, embodiments of the present disclosure can also be applied in projectors using display devices such as DLP (Digital Light Processing), LCOS (Liquid Crystal On Silicon reflective liquid crystal) panels, and the like. Liquid crystal projectors (called simply "projectors") are generally known as single-plate types, three-plate types, or the like, but either type may be used. The liquid crystal projector according to the present embodiment projects an image by controlling the light transmittance of a liquid crystal element according to the image to be displayed, and projecting the image onto the screen with light from a light source transmitted through the liquid crystal element. The configuration and operations of the projector 204 will be described hereinafter.

The projector 204 according to the present embodiment includes a CPU 610, ROM 611, RAM 612, an image input unit 630, an image processing unit 640, an external communication unit 693, an MFP communication unit 695, and the MFP image input/output unit 696. The projector 204 also includes a liquid crystal control unit 650, liquid crystal elements 651R, 651G, and 651B, a light source control unit 660, a light source 661, a color separation unit 662, a color composition unit 663, an optical system control unit 670, and a projection optical system 671. The projector 204 further includes a playback unit 691, a storage medium 692, a communication unit 693 that communicates with an external apparatus, and an image capturing unit 694.

The MFP communication unit 695 is connected to the projector control cable 206, which is connected to the MFP connection connector 208, and communicates with the MFP 101. The CPU 610 determines the status of communication with the MFP 101 and communication with the external apparatus, and determines whether to input/output an image. When it is determined that an image is to be input/output, the MFP image input/output unit 696 performs image input/output with the MFP 101 through the projector projection image cable 207, in accordance with instructions from the CPU 610.

The CPU 610 controls the various blocks of the projector 204. The ROM 611 is memory which stores a control program describing processing sequences for the CPU 610. The RAM 612 serves as work memory, and is memory that temporarily stores control programs, data, and the like. The CPU 610 temporarily stores still image data, moving image data, and the like played back from the storage medium 692 by the playback unit 691 in the RAM 612, and plays back corresponding images, video, and the like using programs stored in the ROM 611. In other words, the RAM 612 functions as graphic memory of the projector 204. The CPU 610 can also temporarily store images, video, and the like acquired by the image capturing unit 694 in the RAM 612, convert those images, video, and the like into still image data, moving image data, and the like using programs stored in the ROM 611, and record the resulting data in the storage medium 692. Upon receiving a printing instruction from the MFP communication unit 695, the CPU 610 copies image data expanded in the RAM 612 into the storage medium 692. This function corresponds to the MFP image input/output unit 696, and is a program stored in the ROM 611. A capture image can be printed by sending image data stored in the storage medium 692 by a screen capture function to the MFP 101 through the projector projection image cable 207.

The image input unit 630 receives an image signal from the external apparatus, and includes, for example, a composite terminal, an S image input terminal, a D terminal, a component terminal, an analog RGB terminal, and the like. The image input unit 630 also includes, for example, a DVI terminal, a DVI-D terminal, an HDMI (High Definition Multimedia Interface) (registered trademark) terminal, and the like. Additionally, when an analog signal is received, the image input unit 630 converts the received analog signal into a digital signal. The image input unit 630 then sends the received image signal to the image processing unit 640. Here, the external apparatus may be any apparatus capable of outputting an image signal, such as a personal computer, a camera, a mobile phone, a smartphone, a hard disk recorder, or the like.

The image processing unit 640 is a unit that performs processing for changing the number of frames, number of pixels, image shape, and the like on the image signal received from the image input unit 630 or the external communication unit 693 and sends the resulting data to the liquid crystal control unit 650, and is constituted by, for example, a microprocessor for image processing. It is not necessary for the image processing unit 640 to be a dedicated microprocessor, and for example, the CPU 610 may execute the same processing as that performed by the image processing unit 640 using programs stored in the ROM 611. The image processing unit 640 is capable of executing functions such as frame thinning processing, frame interpolation processing, resolution conversion processing, OSD superimposition processing for menus and the like, distortion correction processing (keystone correction processing), and edge blending. In addition to the received signals received from the image input unit 630, the image processing unit 640 can also perform the aforementioned change processing on images, video, and the like played back by the CPU 610.

The liquid crystal control unit 650 controls voltages applied to liquid crystals of pixels of the liquid crystal elements 651R, 651G, and 651B on the basis of the image signals processed by the image processing unit 640, and adjusts the transmittances of the liquid crystal elements 651R, 651B, and 651G. It is not necessary for the liquid crystal control unit 650 to be a dedicated microprocessor, and for example, the CPU 610 may execute the same processing as that performed by the liquid crystal control unit 650 using programs stored in the ROM 611. For example, when an image signal is input to the image processing unit 640, the liquid crystal control unit 650 controls the liquid crystal elements 651R, 651B, and 651G to take on transmittances corresponding to the image each time one frame of the image is received from the image processing unit 640. The liquid crystal element 651R is a liquid crystal element for red, and is for adjusting the transmittance of red among the light output from the light source 661 and separated into red (R), green (G), and blue (B) by the color separation unit 662. The liquid crystal element 651G is a liquid crystal element for green, and is for adjusting the transmittance of green among the light output from the light source 661 and separated into red (R), green (G), and blue (B) by the color separation unit 662. The liquid crystal element 651B is a liquid crystal element for blue, and is for adjusting the transmittance of blue among the light output from the light source 661 and separated into red (R), green (G), and blue (B) by the color separation unit 662. The specific operations for controlling the liquid crystal elements 651R, 651G, and 651B by the liquid crystal control unit 650, and the details of the configurations of the liquid crystal elements 651R, 651G, and 651B, will be described later.

The light source control unit 660 controls the light source 661 to turn on and off, controls the light intensity thereof, and so on, and is constituted by a microprocessor for control. It is not necessary for the light source control unit 660 to be a dedicated microprocessor, and for example, the CPU 610 may execute the same processing as that performed by the light source control unit 660 using programs stored in the ROM 611. The light source 661 outputs light for projecting images onto a screen (not shown), and may be, for example, a halogen lamp, a xenon lamp, a high-pressure mercury lamp, or the like. The color separation unit 662 separates the light output from the light source 661 into red (R), green (G), and blue (B), and is constituted by, for example, a dichroic mirror, a prism, and the like.

Note that if LEDs (Light Emitting Diodes) or the like corresponding to each color are used as the light source 661, the color separation unit 662 is not necessary. The color composition unit 663 composites the red (R), green (G), and blue (B) light transmitted through the liquid crystal elements 651R, 651G, and 651B, and is constituted by, for example, a dichroic mirror, a prism, and the like. The light composited from the red (R), green (G), and blue (B) components by the color composition unit 663 is sent to the projection optical system 671. At this time, the liquid crystal elements 651R, 651G, and 651B are controlled by the liquid crystal control unit 650 so that the light transmittance corresponds to the image input from the image processing unit 640. Therefore, when the light composited by the color composition unit 663 is projected onto the screen by the projection optical system 671, the light is displayed on the screen in a manner corresponding to the image input by the image processing unit 640.

The optical system control unit 670 controls the projection optical system 671, and is constituted by a microprocessor for control. It is not necessary for the optical system control unit 670 to be a dedicated microprocessor, and for example, the CPU 610 may execute the same processing as that performed by the optical system control unit 670 using programs stored in the ROM 611. The projection optical system 671 is used to project the composited light output from the color composition unit 663 onto the screen. The projection optical system 671 is constituted by a plurality of lenses and lens actuators, and the lenses can be driven by the actuators so as to magnify, reduce, adjust the focus, and so on for the projected image.

The playback unit 691 reads out the still image data, the moving image data, and the like stored in the storage medium 692 into the RAM 612 and plays the data back, or receives the still image data, the moving image data, and the like of images, video, and the like obtained by the image capturing unit 694 from the CPU 610 and records the data in the storage medium 692. The playback unit 691 may also record the still image data, the moving image data, and the like received by the communication unit 693 into the storage medium 692. The playback unit 691 is constituted by, for example, an interface that is electrically connected to the storage medium 692, a microprocessor for communicating with the storage medium 692, and the like. It is not necessary for the playback unit 691 to include a dedicated microprocessor, and for example, the CPU 610 may execute the same processing as that performed by the playback unit 691 using programs stored in the ROM 611. The storage medium 692 can record still image data, moving image data, other control data necessary for the liquid crystal projector according to the embodiment, and the like. The storage medium 692 may be any type of storage medium, such as a magnetic disk, an optical disk, semiconductor memory, or the like. The storage medium 692 may be removable from the projector 204.

The external communication unit 693 is used to send and receive control signals, still image data, moving image data, and the like from an external apparatus. Here, the external communication unit 693 is connected to the HDMI connector 216 on the projector side, which is connected to the projector 204. The external communication unit 693 is also connected to the projector external input connector (HDMI) 213, which is connected from the projector external input I/F (HDMI) 210.

PC

Figure 10:
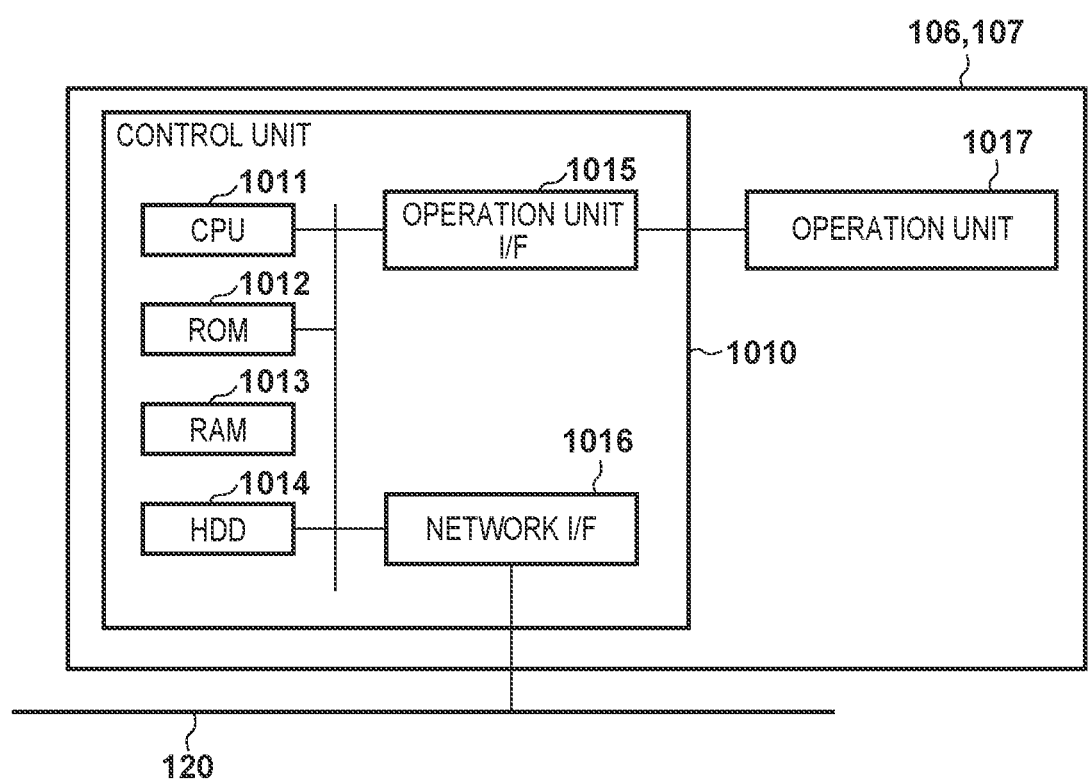
FIG. 10 is a diagram illustrating an example of the configurations of a relay server and a PC according to an embodiment.

The hardware configuration of the relay server 106 and the PC 107 of the web conference system according to the present embodiment will be described next with reference to FIG. 10.

The PC 107 includes a control unit 1010 and an operation unit 1017. The control unit 1010 includes a CPU 1011, ROM 1012, RAM 1013, an HDD 1014, an operation unit I/F 1015, and a network I/F 1016. The control unit 1010, which includes the CPU 1011, controls the PC 107 as a whole. The CPU 1011 implements the functions of the PC 107, the processing of the PC 107 in the sequence chart described below, and processing of a flowchart pertaining to the PC 107 by executing programs stored in the ROM 1012, the HDD 1014, or the like. The ROM 1012 stores various types of programs to be executed by the CPU 1011. The RAM 1013 is used as the main memory of the CPU 1011, a temporary storage region such as a work area, or the like. The HDD 1014 stores image data, various types of programs, and the like. The operation unit I/F 1015 connects the operation unit 1017 and the control unit 1010. The operation unit 1017 includes a liquid crystal display unit having a touch panel function, a keyboard, a mouse, and the like. The network I/F 1016 connects the control unit 1010 to the Internet 120.

The hardware configuration of the relay server 106 is similar to the hardware configuration of the PC 107 in terms of the basic configuration described above. That is, the CPU 1011 of the relay server 106 executes programs stored in the ROM 1012, the HDD 1014, or the like of the relay server 106. As a result, the relay server 106 implements the functions of the relay server 106, the processing of the relay server 106 in the sequence chart described below, and processing of a flowchart pertaining to the relay server 106.

Functional Configuration of Each Apparatus

The functional configurations of the MFP 101, the PC 107, and the relay server 106 according to the present embodiment will be described next with reference to FIG. 11A. The relay server 106 includes a session management service 1121, the account management service 1122, the document management service 1123, and the relay service 1120. Two types of accounts can be registered with the account management service 1122, namely a user (individual) account and a connected device account. The user (individual) account requires a name, email address, and password to be entered, and group registration is possible as well, if necessary. The password is used for personal authentication. Although the authentication method is not particularly limited in the present embodiment, it is possible to use an authentication system of the relay server 106 itself, and the account management service can have its own authentication system. When registering a connected device, the device's device number, device name, and password are registered. The device's device number and the password are used for authentication. The data required for these accounts can be entered from the operation unit 1017 of the relay server 106. The session management service 1121 manages the session number, start time, and participating accounts. Participating accounts are accounts that have been authenticated by the account management service 1122. When a connection request is made from the exterior to the relay service 1120, the relay service 1120 makes a query to the session management service 1121. If the session and participants match, the relay service 1120 starts relay. The document management service 1123 determines whether or not a document can be displayed according to the flowchart in FIG. 13, described below. If the document cannot be displayed, the participant is notified that the document cannot be displayed. In the present embodiment, the participating account is indicated as a connected device, but individual accounts are also possible.

The MFP 101 includes a web server 1102, a web browser 1131, the client 1132 which is a client program for the MFP 101 of the web conferencing system, a server-side proxy 1101, and a client-side proxy 1130. In this manner, the MFP 101 has an internal web browser function. Components 444 of the MFP 101 include an audio encoder 1105, an audio decoder 1106, a moving image encoder 1107, a moving image decoder 1108, and a print control module 1109.

The PC 107 includes a web browser 1111, a web conferencing system client 1112, and a client-side proxy 1110. In addition, the PC 107 includes an audio encoder 1113, an audio decoder 1114, a moving image encoder 1115, a moving image decoder 1116, and a print control module 1117. The client 1132 of the MFP 101 and the client 1112 of the PC 107 in the web conference system are both application programs. The client 1112 uses the moving image encoder 1115 to encode the image displayed in a display (not shown) of the PC 107. Additionally, audio input by a microphone connected to the PC 107 is encoded by the audio encoder 1113. The encoded audio and moving image are contained in HTTP (Hyper Text Transfer Protocol) files. Similarly, the encoded audio data contained in the HTTP file is decoded by the audio decoders 1106 and 1114. The audio is output by a speaker (not shown), and the encoded moving image data is decoded by the moving image decoders 1108 and 1116, and the moving image is displayed in the web browsers 1131 and 1111. The encoded audio data and moving image data is sent and received through HTTP via the relay service 1120. The print control modules 1109 and 1117 perform control pertaining to printing restrictions. This will be described in greater detail later.

Upon receiving a connection instruction via the operation unit 250, the server-side proxy 1101 establishes a connection with the relay service 1120 and then mediates (relays) the communication between the relay service 1120 and the web server 1102. The web server 1102 has a function for, upon receiving a request through HTTP (Hyper Text Transfer Protocol) communication from the relay server 106, returning a response to the request. The client-side proxy 1110 in the PC 107 mediates (relays) the communication between the web browser 1111 and the relay service 1120. The client-side proxy 1130 in the MFP 101 mediates (relays) the communication between the web browser 1131 and the relay service 1120. The relay service 1120 provides a web server function, and has a function for, upon receiving a request through HTTP communication from the PC 107 and the MFP 101, returning a response to the request.

HTTP communication between the server-side proxy 1101 and the relay service 1120, and HTTP communication between the client-side proxies 1110 and 1130 and the relay service 1120, will be described here. HTTP is a client/server-type protocol defined in RFC (Request For Comment) 2616, and has multiple methods. In general, the GET method is used when a client receives information from a server, and the POST method is used when a client sends information to a server. In the present embodiment, the POST method is used when the server-side proxy 1101 sends data to the relay service 1120, and when the client-side proxies 1110 and 1130 send data to the relay service 1120. The GET method is used when the server-side proxy 1101 receives data from the relay service 1120, and when the client-side proxies 1110 and 1130 receive data from the relay service 1120. Furthermore, separate connections are used for transmission and reception. The moving image data sent and received using the HTTP protocol is expanded in the RAM 402 of the controller unit 400, sent to the projector 204 via the projector I/F 443, and is displayed.

Processing Sequence

Projection of Read Image

Figure 12A:
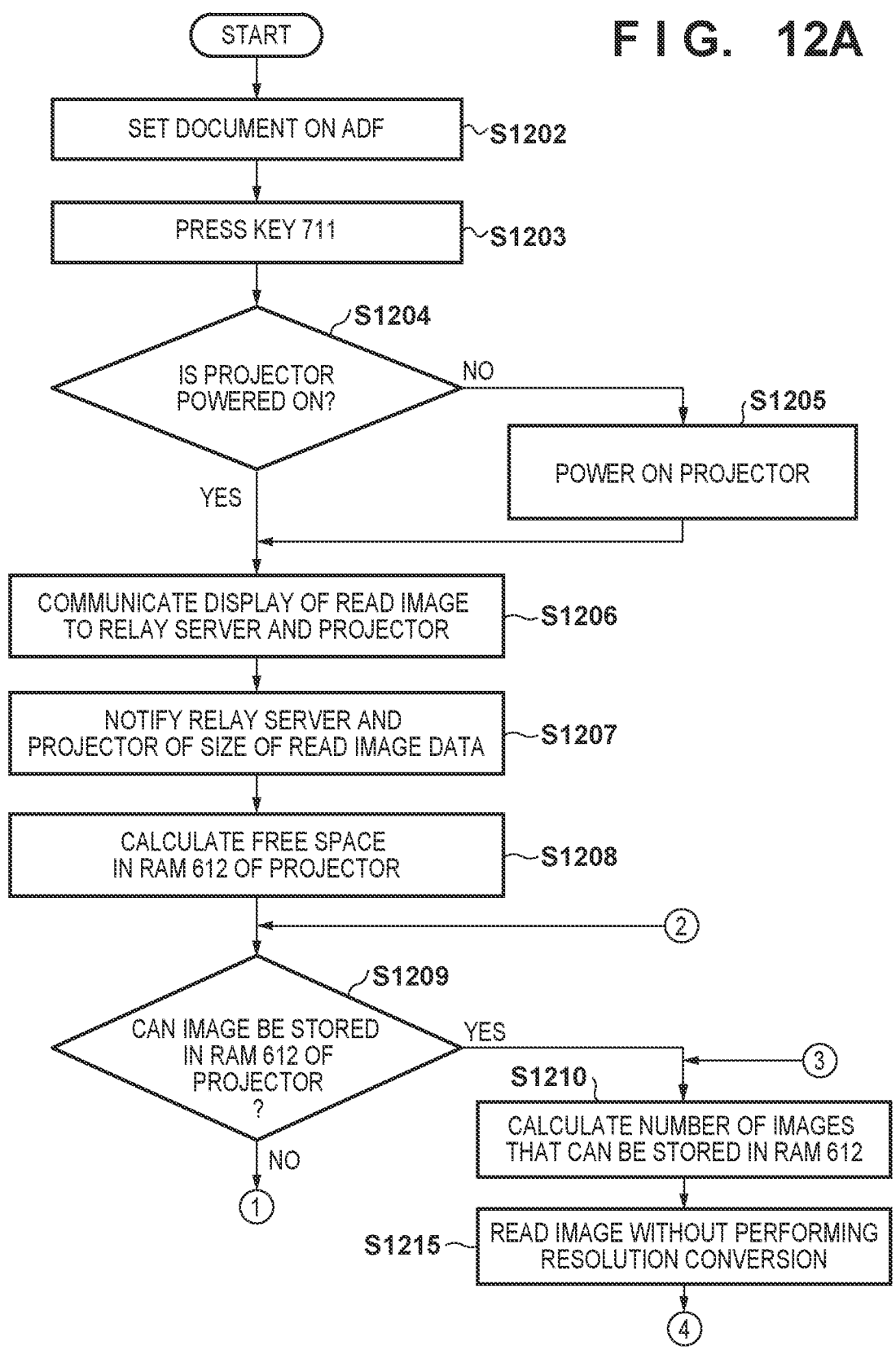
FIGS. 12A-12B are a flowchart illustrating an image read by the reader function unit 201 being sent to a projector 204 and a relay server 106 according to an embodiment.
Figure 12B:
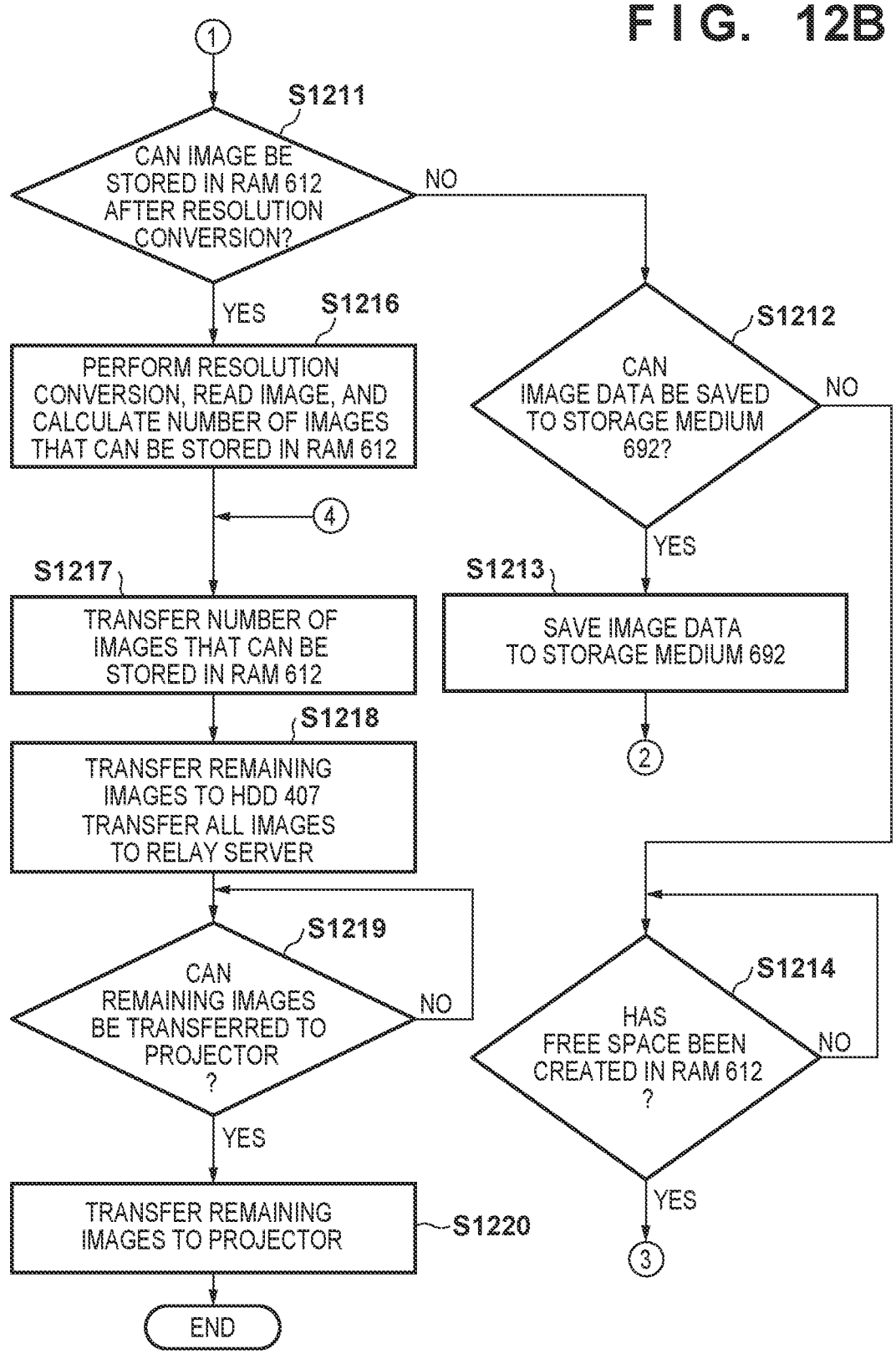
Figure 13:
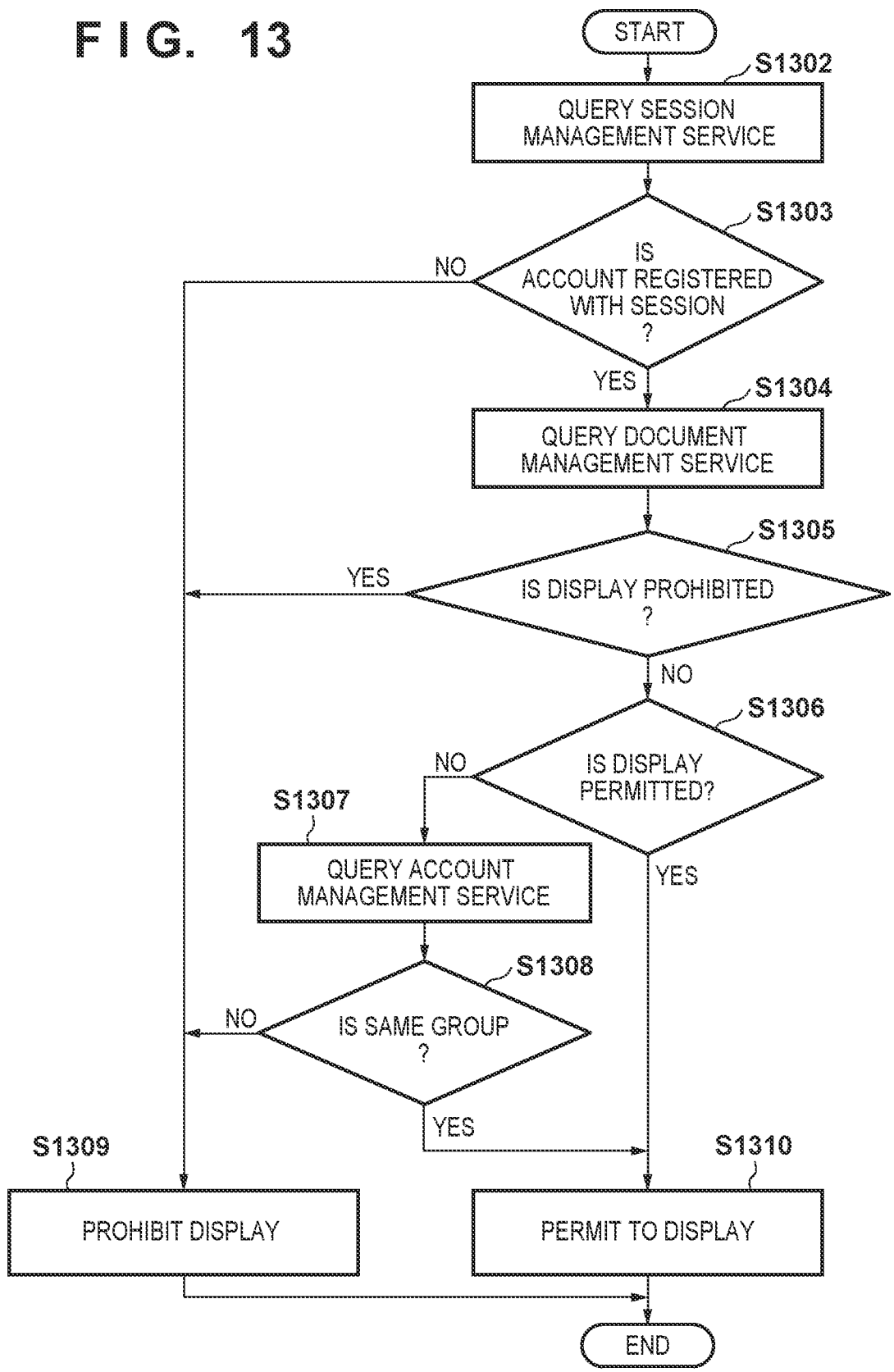
FIG. 13 is a flowchart illustrating a display made in a web conference according to an embodiment.

Various processing sequences will be described hereinafter with reference to FIGS. 12 to 14. FIGS. 12A-12B illustrate a processing sequence for reading an image using the reader function unit 201, displaying the image using the projector 204, and sending the read image to the relay server 106. Operations performed when the post-reading projector display key 711 is pressed will be described here. The processing described below is realized by, for example, the CPU 401 reading out a program, stored in the ROM 406, the HDD 407, or the like in advance, into the RAM 402 and executing that program.

In step S1202, the CPU 401 detects that a document has been placed on an ADF by the user. Then, in step S1203, the CPU 401 detects that the post-reading projector display key 711 in the operation unit 250 has been pressed by the user. Specifically, for user operations performed through the operation unit 250, commands (operation information) are sent to the system bus 416 through the operation unit I/F 403 and are communicated to the CPU 401. The CPU 401 may start reading the document placed on the ADF using the reader function unit 201 at this timing. The timing of the start of reading may be any timing, such as, for example, after it is confirmed that the projector 204 is powered on (described later).

Next, in step S1204, the CPU 401, to which the command has been communicated, acquires the state of the projector 204 through the projector I/F 443, and determines whether or not the projector 204 is powered on on the basis of the acquired state information. If the projector 204 is not powered on, the sequence moves to step S1205, where the CPU 401 turns on the power to the projector 204 by energizing a power wire contained in the projector control cable 206. The sequence then moves to step S1206. If in step S1204 it is determined that the power is on, the sequence moves directly to step S1206.

In step S1206, the CPU 401 communicates a display request to the projector 204 and the relay server 106. Note that the relay server 106 transfers the received display request to the terminals participating in the web conferencing system, e.g., the PC 107. Then, in step S1207, the CPU 401 uses the compressor 413 to compress the image data read from the document by the reader function unit 201 and converted into data, and stores the compressed image data in the RAM 402. Here, the CPU 401 calculates the size of the image data after compression, as well as the size of the image data in a case where the resolution thereof has been converted, as the data size of the image read by the reader function unit 201, and notifies the relay server 106 and the projector 204 of the size after compression. Note that the relay server 106 transfers the received image data to the terminals participating in the web conferencing system, e.g., the PC 107. Here, the "image data in the case where the resolution thereof has been converted" is image data converted to a lower resolution, and the data size is smaller than that of the image data before the conversion. The actual processing performed when reading after resolution conversion is the process of step S1216, which is described below. Furthermore, in step S1208, the CPU 401 acquires the free space in the RAM 612, calculated by the CPU 610 of the projector 204, after which the sequence moves to step S1209. An example in which the CPU 401 acquires the free space in the RAM 612 from the CPU 610, and the processing from step S1209 onward is then executed, is described here. However, the present disclosure is not limited thereto, and for example, the CPU 401 may notify the CPU 610 of the projector 204 of the size of the image data calculated in step S1207, and the subsequent processing may then be executed by the CPU 610.

In step S1209, the CPU 401 determines whether or not image data having the image size acquired in step S1207 can be stored in the RAM 612 based on the free space in the RAM 612 communicated by the CPU 610. If the image data cannot be stored in the RAM 612, the sequence moves to step S1211, whereas if the image data can be stored in RAM 612, the sequence moves to step S1210. In step S1211, the CPU 401 determines whether or not the image data can be stored in the RAM 612 at the size of the image data after resolution conversion. If the data can be stored, the sequence moves to step S1216, and if not, the sequence moves to step S1212.

In step S1212, the CPU 401 determines whether or not the image data can be saved to the storage medium 692. If the image data can be saved, the sequence moves to step S1213, and if not, the sequence moves to step S1214. In step S1213, the CPU 401 saves the image data to the storage medium 692, after which the sequence returns to step S1209, where it is once again determined whether or not the image data can be stored in the RAM 612. This is because the image data that has been processed for display by the projector 204 is deleted from the RAM 612, and it is therefore necessary to confirm again whether the free space has been secured. If free space cannot be secured in the RAM 612 even after this, the image data has already been saved to the storage medium 692 once, and thus the processes of steps S1212 and S1213 are skipped and the determinations of steps S1209 and S1211 are made periodically.

On the other hand, if it is determined in step S1212 that the image data cannot be saved to the storage medium 692, the sequence moves to step S1214, where the CPU 401 determines whether or not free space has been created in the RAM 612. The system waits until the free space is secured in the RAM 612, due to the presentation ending or the like, and when sufficient free space has been secured, the sequence moves to step S1216. In addition to the determination in step S1214, the same determination as that of step S1211 may be added.

If it is determined in step S1211 that the image can be stored in the RAM 612 after resolution conversion, the sequence moves to step S1216, where the CPU 401 sets the resolution conversion, reads the image, and calculates the number of images that can be stored in the RAM 612, after which the sequence moves to step S1217. If it is determined in step S1209 that the image can be stored in the RAM 612 without resolution conversion, the sequence moves to step S1210, where the CPU 401 calculates the number of images that can be stored. The sequence then moves to step S1215, where the CPU 401 reads the image without setting resolution conversion, after which the sequence moves to step S1217.

When the image reading is complete, the sequence moves to step S1217, where the CPU 401 transfers the image data of the number of images to be stored in the RAM 612. The remaining images are transferred to the HDD 407 for storage in step S1218. In step S1218, the CPU 401 further sends all the images to the relay server 106. Note that the relay server 106 transfers all the received images to the terminals participating in the web conferencing system, e.g., the PC 107. At this timing, the image scanned from the document may be converted to a document file which can then be acquired from a predetermined URL. In this case, the document file to be acquired may be stored in the relay server 106, or in the MFP 101. Alternatively, the document file can be stored in another external apparatus. When the URL is generated, it is desirable to update the information managed by the relay server 106, illustrated in FIG. 11B. Of course, the URL for acquisition may be set in advance before the document is read by the MFP 101, and the corresponding document file may be stored in a predetermined apparatus. Then, in step S1219, the CPU 401 determines whether or not the image stored in the HDD 407 can be transferred to the projector 204. If the image can be transferred, the sequence moves to step S1220, where the remaining images are transferred to the projector 204, after which the sequence ends.

It is also possible to encode the image data located in the RAM 402 in a moving image format. The CPU 401 encodes the image data through the moving image encoder 1107 via the system bus 416. The encoded data can be displayed in the web browser of the PC 107 through the web conference system client 1132 and the relay service 1120.

Display During Web Conference

A processing sequence performed during display in a web conference will be described next with reference to FIG. 13. A processing sequence performed when the MFP 101 notifies the relay service 1120 of the session number, the device number, and a PIN number, and displays the image, will be described here. The processing described below is realized by, for example, the CPU 401 reading out a program, stored in the ROM 406, the HDD 407, or the like in advance, into the RAM 402 and executing that program. Although the processing is described here as processing performed by the MFP 101, the processing may be performed by the relay server 106. The processing described below is processing for accepting a user operation via the operation screens described with reference to FIGS. 7A1 to 7A11 and FIGS. 9A to 9C.

First, the session number, the device number, and the PIN (personal identification number) notifications and an image display request are accepted via the operation screens described with reference to FIGS. 7A1 to 7A11 and FIGS. 9A to 9C. Upon receiving these items, in step S1302, the CPU 401 queries the session management service 1121 according to the content of the accepted request via the relay service 1120. The session management service 1121 holds the data indicated by 1150 in FIG. 11B for each session. Each session contains the following information for each session number 1151: a web conference start time 1152; a web conference creator (host) 1153; and web conference participating members 1154. The account management service 1122 also holds the data indicated by 1160 in FIG. 11B, for each account. Each account includes a type 1161 indicating an apparatus or a person, account identification information 1162, group information 1163, and a PIN 1164. The group information 1163 includes information indicating whether or not the account belongs to a group, and if so, the group. If the session number communicated by the projector 204 is managed by the session management service 1121, the relay service 1120 queries the account management service 1122 to perform authentication using the PIN communicated by the projector 204.

After verifying the PIN, the sequence moves to step S1303, where the CPU 401 determines whether or not the session included in the accepted request is registered with the session management service 1121 and the account has been successfully authenticated. If the authentication is successful, the sequence moves to step S1304, whereas if the session is not registered or the authentication fails, the sequence moves to step S1309. In step S1309, the CPU 401 rejects the image display request, and the flowchart ends without causing the PC 107 or the like to display the image.

On the other hand, if the session is registered with the session management service 1121 and the account is registered as a participating member, the sequence moves to step S1304. In step S1304, the CPU 401 queries the document management service 1123 for the display screen corresponding to the display request. The document management service 1123 holds the data pertaining to documents indicated by 1170 in FIG. 11B, and manages information about document corresponding to the image in the display request. 1170 includes a name 1171, a URL 1172, print restriction information 1173, editing restriction information 1174, display restriction information 1175, and a session number 1176 for each document. The print restriction information 1173 includes information that specifies whether or not the document file that is the basis of the display screen in the web conference can be printed. The editing restriction information 1174 includes information that specifies whether or not the document file can be edited. The display restriction information 1175 includes information that specifies whether or not the document file can be displayed.

Then, in step S1305, the CPU 401 determines whether the display of data matching the data of the session number in question is permitted on the basis of the result of the query to the document management service 1123, and in particular, the corresponding display restriction information 1175. If the display is prohibited (NG), the sequence moves to step S1309, and if not, the sequence moves to step S1306, where the CPU 401 determines whether or not the display is permitted (OK). If the display is permitted (OK), the sequence moves to step S1310, and if not, (in FIG. 11B, "Display Gr OK"), the sequence moves to step S1307. Here, "Display Gr OK" indicates that display is permitted if a corresponding account is included in the same group associated with a predetermined session number. This determines whether or not one is a participating member of the web conference associated with a predetermined session number. Although this example described whether or not a group is associated with a predetermined session number, this is not intended to limit the present disclosure, and any configuration can be used as long as the groups which can be displayed can be determined. In other words, control may be performed so that the display is permitted for any member in a predetermined group. This registered information is merely an example, and is not intended to limit the present disclosure.

In step S1307, the CPU 401 queries the account management service 1122 as to whether or not the group is the same group associated with the corresponding session, and if the group is the same group, the sequence moves to step S1310. In other words, the display is permitted if the corresponding account is set to the same group information related to the current web conference in the group information 1163 indicated by 1160, managed by the account management service 1122. If the groups are not the same, the sequence moves to step S1309.

In step S1310, the CPU 401 determines that the display is permitted, transfers the display request to the target terminal (e.g., the PC 107), and causes the display to be made, after which the sequence ends. Although an example in which the CPU 401 of the MFP 101 performs the display control in the web conferencing system is described here, this is not intended to limit the present disclosure. For example, the relay service 1120 that accepts the above-described notifications or display request from the CPU 401 in step S1302 may perform the subsequent processing and return a control result to the MFP 101. This makes it possible to reduce the number of transactions between the MFP 101 and the relay server 106 in each process, which in turn reduces the processing load.

Printing During Web Conference

A processing sequence performed when printing from the MFP 101 in a web conference will be described next with reference to FIG. 14. The processing described below is realized by, for example, the CPU 401 reading out a program, stored in the ROM 406, the HDD 407, or the like in advance, into the RAM 402 and executing that program. Note that the processing described below is processing for accepting a user operation via the operation screens described with reference to FIGS. 7A1 to 7A11 and FIGS. 9A to 9C.

First, in step S1401, the CPU 401 sets printing to be prohibited for the image being displayed or projected in the web conference using the print control modules 1109 and 1117, via the web conference system clients 1132 and 1112. The print control module 1109 on the MFP 101 side is included in the network module 404, and after communicating with the relay server 106, communicates with the projector 204 and sets the MFP image input/output unit 696 to be prohibited from operating. This makes it possible to temporarily prohibit screen capture in the projector 204. In other words, a restriction is put into place so that the image itself cannot be acquired during the projection. In addition, the print control module 1117 on the PC 107 side accepts a notification that printing is prohibited via the relay server 106, and because it is necessary to perform control so that a screen capture is not taken, for example, the key for the corresponding input is disabled in the PC 107. Thereafter, when the session number, the PIN, and a print request are accepted by the MFP 101, the sequence moves to step S1402, where the CPU 401 queries the document management service 1123 via the relay service 1120. This information is accepted, for example, through the screens described with reference to FIGS. 7A1 to 7A11 and FIGS. 9A through 9C. In other words, in addition to the MFP 101, the information can be accepted from an external apparatus such as the PCs 103, 105, and 107. The relay server 106 manages the information 1150, 1160, and 1170 indicated in FIG. 11B as described above. Then, the PIN is verified, and the sequence moves to step S1403, where the CPU 401 refers to the print restriction information 1173 indicated by 1170 in FIG. 11B through the document management service 1123. The CPU 401 then determines whether or not the document to be printed is prohibited from being printed. If printing is prohibited, the sequence moves to step S1407, where the CPU 401 displays an indication that printing is prohibited in the operation unit or a remote operation unit (a display unit of an external apparatus such as the PC 105), after which the flowchart ends. Although the authentication is performed using the account identification information (device number or account information) 1162 and the PIN 1164 indicated by 1160 here, authentication using a username and password is also acceptable.

On the other hand, if printing is not prohibited, the sequence moves to step S1404, where the CPU 401 determines whether or not the image acquired by the MFP image input/output unit 696 is to be printed. Specifically, the CPU 401 determines whether or not print data can be generated from the capture image. For example, if printing instructions for multiple pages (e.g., a moving image) are set as a print setting condition, or if the user does not wish to print unnecessary portions of the screen capture, it is determined that it is necessary to acquire the URL and print using the document file itself, and the sequence moves to step S1405. If such is not the case, the sequence moves to step S1413, where the CPU 401 takes a screen capture through the MFP image input/output unit 696. The sequence then moves to step S1412, where the captured screen is printed.

In step S1405, the CPU 401 queries the account management service 1122, and determines whether or not the account belongs to a group that can acquire the URL in step S1406. The account here is the account that corresponds to the PIN when the above-described print request is accepted. If the URL cannot be acquired, the sequence moves to step S1413, where a screen capture is taken and printed out in step S1412. Here, when it is determined that a file cannot be acquired, control is performed for printing using a screen capture, but this is not intended to limit the present disclosure. For example, the processing may be ended without also printing by screen capture. This is because although the printing instruction is for multiple pages, only the image that is being displayed or projected will be printed, which may not produce the printed material which the user desires. Alternatively, the user may be notified that the document file cannot be acquired and therefore queried as to whether to print only the image of the screen capture. On the other hand, if the URL can be acquired, the sequence moves to step S1408, where the CPU 401 acquires the URL from the relay server 106. The URL acquired is the information in URL 1172 indicated by 1170.

Once the URL is acquired, in step S1409, the CPU 401 checks for access errors to the URL in order to acquire the content of the file. An error will occur if there is a communication error, if there is no file, or the like. If an error occurs, the processing is ended without printing. It is also possible to notify the user that printing could not be performed due to an access error. It is also possible to perform control so that only the screen capture is printed, as is the case after the determination of step S1406. If no error occurs, the sequence moves to step S1410, where the CPU 401 accesses the URL, acquires the document file in question, and expands the image in step S1411, after which the sequence moves to step S1412. Note that if the print request is a request from an external apparatus, the document file acquired through the URL may be sent to that external apparatus.

In step S1412, the CPU 401 executes printing using the print data expanded in step S1411 or the capture screen acquired in step S1413, after which the processing ends.

As described thus far, this web conferencing system includes a storage unit in which session information pertaining to connections in the web conference, account information of participating users, and document information pertaining to document files serving as the basis of screens displayed in the web conference are registered in advance. The storage unit is realized by, for example, memory of the relay server 106. Additionally, in this system, when an image is displayed or projected in accordance with image data serving as a display screen and a print request for an image related to the display screen is accepted along with authentication information, it is determined whether or not printing is possible on the basis of the information stored in the storage unit and the authentication information. Then, the system executes the printing in accordance with the determination as to whether or not printing is possible. A similar determination can be made with respect to a display request, an editing request, and the like for the document file serving as the basis of the display screen.

Additionally, the system can acquire a capture image of the display screen, and can furthermore access a URL from which a document file serving as the basis of the display screen can be acquired and acquire the document file. In this situation, when the print request is accepted, a determination such as that described below is made. For example, if the print request is a print request for the display screen and printing of the document corresponding to the print request is permitted, printing using the acquired capture image is permitted. On the other hand, if the print request is a print request including multiple pages pertaining to the display screen or is a print request from which an unnecessary portion has been deleted, and both the corresponding document is permitted to be printed and the user that made the print request can access a URL, printing using the document file is permitted. In this case, if the URL cannot be accessed, printing using the acquired capture image is permitted. On the other hand, if printing of the document corresponding to the print request is not permitted, the printing is prohibited.

In this manner, according to the present embodiment, data read from the MFP 101 can be shared, the content of screen displays made in a web conference can be printed by the MFP 101, and the like, as a service of the web conferencing system. In a web conferencing system that sends and receives moving images and audio, sending a URL when it is necessary to print makes it possible to reduce the network load. Additionally, it is possible to appropriately restrict whether or not display, printing, and editing are permitted, as well as permissions within groups, in accordance with the details of settings. This makes it possible, for example, to only display images that are only permitted to be viewed, without printing those images, which makes it possible to provide a secure web conference system for a variety of situations. In other words, embodiments of the present disclosure can provide a mechanism to enable printing (or displaying, editing, or the like) of screens, materials, and so on being displayed in a web conference system in a suitable manner, while providing restrictions for security purposes. Furthermore, when unnecessary portions are to be omitted through a screen capture, it is necessary to print multiple pages (a moving image or the like), or the like, providing a method for acquiring a document file itself (i.e., accessing a predetermined URL) makes it possible to print multiple pages. According to this configuration, data can be sent and received only when printing is necessary, which makes it possible to reduce network traffic, as well as allow only users having printing privileges to acquire and print a document according to access rights set for the document.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-161327, filed Sep. 25, 2020, which is hereby incorporated by reference herein in its entirety.

What is claimed is:

1. A printing system comprising:
a projection unit that projects an image;
a printer;
an accepting unit that accepts a request to print based on a capture image of an image projected by the projection unit;
a determination unit that determines whether or not printing based on the capture image of the image projected by the projection unit is possible; and
a control unit that:
in a case where the determination unit determines that the printing of the image projected by the projection unit is possible, permits the printer to print based on the capture image of the image projected by the projection unit on the basis of the request accepted by the accepting unit, and
in a case where the determination unit determines that the printing of the image projected by the projection unit is not possible, restricts the printer from printing based on the capture image of the image projected by the projection unit on the basis of the print request accepted by the accepting unit.

2. The printing system according to claim 1,
wherein the image projected by the projection unit includes an image based on a file, and
in a case where the determination unit determines that the printing of the image projected by the projection unit is not possible, the control unit acquires the file.

3. The printing system according to claim 2,
wherein in a case where the determination unit determines that the printing of the image projected by the projection unit is not possible, the control unit acquires information for acquiring the file, and acquires the file on the basis of the information acquired.

4. The printing system according to claim 3,
wherein in a case where the determination unit determines that the printing of the image projected by the projection unit is not possible, the control unit further determines whether or not information for acquiring the file can be acquired, and
in a case where it is determined that the information can be acquired, the control unit acquires the information.

5. The printing system according to claim 2,
wherein the image projected by the projection unit includes an image based on a file, and
in a case where the determination unit determines that the printing of the image projected by the projection unit is not possible, the control unit acquires the file and causes the printer to print based on the file acquired.

6. The printing system according to claim 1, further comprising:
a reader that reads a document,
wherein the projection unit is further capable of projecting an image read by the reader.

7. A method of controlling a printing system, the printing system including a projection unit that projects an image and a printer, the method comprising:
accepting a request to print based on a capture image of an image projected by the projection unit;
determining whether or not printing based on the capture image of the image projected by the projection unit is possible;
in a case where it is determined that the printing of the image projected by the projection unit is possible, permitting the printer to print based on the capture image of the image projected by the projection unit on the basis of the request accepted; and
in a case where it is determined that the printing of the image projected by the projection unit is not possible, restricting the printer from printing based on the capture image of the image projected by the projection unit on the basis of the print request accepted.

8. A non-transitory computer-readable storage medium storing a computer program for causing a computer to execute a method of controlling a printing system, the printing system including a projection unit that projects an image and a printer, the method comprising:
accepting a request to print based on a capture image of an image projected by the projection unit;
determining whether or not printing based on the capture image of the image projected by the projection unit is possible;
in a case where it is determined that the printing of the image projected by the projection unit is possible, permitting the printer to print based on the capture image of the image projected by the projection unit on the basis of the request accepted; and
in a case where it is determined that the printing of the image projected by the projection unit is not possible, restricting the printer from printing based on the capture image of the image projected by the projection unit on the basis of the print request accepted.

* * * * *